United States Patent
Yanai et al.

(10) Patent No.: US 10,642,145 B2
(45) Date of Patent: May 5, 2020

(54) TRANSPARENT SCREEN AND IMAGE DISPLAY SYSTEM

(71) Applicant: FUJIFILM Corporation, Tokyo (JP)

(72) Inventors: Yujiro Yanai, Minami-ashigara (JP); Michio Nagai, Minami-ashigara (JP); Akira Yamamoto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/178,165

(22) Filed: Nov. 1, 2018

(65) Prior Publication Data

US 2019/0079380 A1    Mar. 14, 2019

Related U.S. Application Data

(63) Continuation of application No. PCT/JP2017/016281, filed on Apr. 25, 2017.

(30) Foreign Application Priority Data

May 2, 2016    (JP) .................. 2016-092451

(51) Int. Cl.
   *G03B 21/62*    (2014.01)
   *G02B 5/30*    (2006.01)
   (Continued)

(52) U.S. Cl.
   CPC ........... *G03B 21/62* (2013.01); *G02B 5/0294* (2013.01); *G02B 5/30* (2013.01); *G02B 5/3016* (2013.01);
   (Continued)

(58) Field of Classification Search
   CPC ...................................... G03B 21/56
   (Continued)

(56) References Cited

U.S. PATENT DOCUMENTS 3,912,369 A  * 10/1975  Kashnow .......... G02F 1/133528
                                                  349/117
6,912,029 B2 *  6/2005  Tanaka ................. G02B 5/3083
                                                  349/118
(Continued)

FOREIGN PATENT DOCUMENTS

JP          5-107660 A      4/1993
JP          6-67020 A       3/1994
(Continued)

OTHER PUBLICATIONS

International Preliminary Report on Patentability and Written Opinion of the International Searching Authority (forms PCT/IB/373, PCT/ISA/237 and PCT/IB/326), dated Nov. 15, 2018, for corresponding International Application No. PCT/JP2017/016281, with a Written Opinion translation.

(Continued)

*Primary Examiner* — Clayton E. LaBalle
*Assistant Examiner* — Kevin C Butler
(74) *Attorney, Agent, or Firm* — Birch, Stewart, Kolasch & Birch, LLP

(57) ABSTRACT

Provided are a transparent screen having high transparency in which a hot spot caused by transmitted light can be reduced; and an image display system in which visibility of a screen is excellent and a hot spot is reduced by using the transparent screen. The transparent screen includes, in this order: a first λ/4 plate; a reflecting layer that has a structure obtained by immobilizing a cholesteric liquid crystalline phase and reflects a part of incidence light; and a polarizing film that has an absorption axis in a thickness direction.

10 Claims, 5 Drawing Sheets

(51) Int. Cl.
  *G02B 5/02* (2006.01)
  *G03B 21/604* (2014.01)
  *G02B 27/09* (2006.01)
(52) U.S. Cl.
  CPC ....... *G02B 5/3025* (2013.01); *G02B 27/0977* (2013.01); *G03B 21/604* (2013.01); *G02B 5/3083* (2013.01)
(58) Field of Classification Search
  USPC .......................................................... 359/443
  See application file for complete search history.

(56) References Cited

U.S. PATENT DOCUMENTS

| | | | | |
|---|---|---|---|---|
| 6,995,917 | B1* | 2/2006 | Sampsell | G02B 27/123 348/E5.141 |
| 7,326,451 | B2* | 2/2008 | Takeda | G02B 5/3016 349/18 |
| 9,829,615 | B2* | 11/2017 | Watano | G02B 5/3041 |
| 2003/0151705 | A1* | 8/2003 | Saiki | G02B 5/3083 349/96 |
| 2005/0078245 | A1* | 4/2005 | Sasaki | G02B 5/3016 349/117 |
| 2005/0117217 | A1* | 6/2005 | Yamaoka | G02B 5/3033 359/485.03 |
| 2005/0206810 | A1* | 9/2005 | Sasaki | G02B 1/08 349/96 |
| 2007/0134441 | A1* | 6/2007 | Shutou | G02B 5/3016 428/1.3 |
| 2007/0139766 | A1* | 6/2007 | Radcliffe | G02F 1/13471 359/459 |
| 2008/0182041 | A1* | 7/2008 | Sekine | G02B 5/3016 428/29 |
| 2008/0297726 | A1* | 12/2008 | Rodriguez, Jr. | G03B 21/14 353/13 |
| 2009/0195733 | A1* | 8/2009 | Saitoh | G02B 5/3016 349/96 |
| 2016/0274450 | A1* | 9/2016 | Usukura | G02B 5/26 |
| 2017/0235030 | A1* | 8/2017 | Tanaka | G02F 1/1335 349/11 |
| 2017/0343830 | A1* | 11/2017 | Nagai | G03B 21/60 |
| 2018/0074315 | A1* | 3/2018 | Yanai | G02B 5/26 |
| 2018/0321577 | A1* | 11/2018 | Yanai | G03B 21/60 |
| 2019/0064411 | A1* | 2/2019 | Yanai | G02B 5/0242 |
| 2019/0079380 | A1* | 3/2019 | Yanai | G03B 21/604 |
| 2019/0094432 | A1* | 3/2019 | Yanai | G02B 5/30 |

FOREIGN PATENT DOCUMENTS

| | | | | |
|---|---|---|---|---|
| JP | 11-282087 A | | 10/1999 | |
| JP | H11282087 | * | 10/1999 | ............ G03B 21/62 |
| JP | 2009-205143 A | | 9/2009 | |
| JP | 2010-529493 A | | 8/2010 | |
| JP | 2014-71250 A | | 4/2014 | |
| JP | 2014071250 | * | 4/2014 | ............ G02B 3/00 |
| WO | WO 2015/068431 A1 | | 5/2015 | |
| WO | WO 2016/056617 A1 | | 4/2016 | |
| WO | WO-2016194327 A1 | * | 12/2016 | ............ G02B 5/26 |
| WO | WO-2017188182 A1 | * | 11/2017 | ............ G02B 5/30 |
| WO | WO-2017204103 A1 | * | 11/2017 | ............ G02B 5/30 |

OTHER PUBLICATIONS

International Search Report (form PCT/ISA/210), dated Aug. 1, 2017, for corresponding International Application No. PCT/JP2017/016281, with an English translation.

* cited by examiner

TRANSPARENT SCREEN AND IMAGE DISPLAY SYSTEM

CROSS-REFERENCE TO RELATED APPLICATIONS

This application is a Continuation of PCT International Application No. PCT/JP2017/016281 filed on Apr. 25, 2017, which claims priority under 35 U.S.C. § 119(a) to Japanese Patent Application No. 2016-092451 filed on May 2, 2016. The above application is hereby expressly incorporated by reference, in its entirety, into the present application.

BACKGROUND OF THE INVENTION

1. Field of the Invention

The present invention relates to a transparent screen and an image display system including this transparent screen.

2. Description of the Related Art

Recently, as a screen constituting a projection type display device, a transparent screen that diffuses and/or reflects projection light projected from a projector to display an image and allows transmission of light from front and back surfaces is known.

For example, JP1993-107660A (JP-H5-107660A) describes a projection type liquid crystal projection system including a transparent screen in which a cholesteric liquid crystal that reflects red light, green light, and blue light of right or left circularly polarized light is used. In the projection type liquid crystal projection, transmission of a right or left circularly polarized light component of external light emitted to the transparent screen is allowed by polarizing red light, green light, and blue light projected to the transparent screen into right or left circularly polarized light using a $\lambda/4$ plate.

SUMMARY OF THE INVENTION

However, in a case where an image is displayed using a projector, there is a problem in that a hot spot occurs. For example, in the image display system including the transparent screen described in JP1993-107660A (JP-H5-107660A), the hot spot refers to a phenomenon in which a light source of a projector is observed on a side of the transparent screen opposite to the projector in a straight advancing direction of outgoing light of the projector. In a case where a hot spot occurs due to transmitted light having transmitted through the transparent screen, the hot spot appears glaring in case of being observed from the side of the transparent screen opposite to the projector.

In the transparent screen described in JP1993-107660A (JP-H5-107660A), in a case where the transparency of the screen is high, a hot spot is significantly glaring. In particular, in a laser projector in which a transparent screen is used and a laser is used as a light source, a hot spot is extremely glaring.

In a typical opaque screen, specularly reflected light in a straight advancing direction of outgoing light of a projector causes a hot spot to occur. In the opaque screen, an uneven structure is imparted to the outermost surface of the screen to diffuse light such that a hot spot caused by specularly reflected light is reduced.

However, in the transparent screen described in JP1993-107660A (JP-H5-107660A), in a case where the uneven structure is imparted to the outermost surface, the transparency significantly deteriorates, and thus a countermeasure thereagainst cannot be used.

That is, in an image display system including a transparent screen, it is desired to develop a transparent screen in which high transparency is secured and a hot spot caused by transmitted light is reduced.

An object of the present invention is to solve the above-described problem of the related art and to provide a transparent screen having high transparency in which a hot spot caused by transmitted light can be reduced, and an image display system including the transparent screen.

As a result of thorough investigation for achieving the object, the present inventors found that the object can be achieved by providing a first $\lambda/4$ plate, a reflecting layer that has a structure obtained by immobilizing a cholesteric liquid crystalline phase and reflects a part of incidence light, and a polarizing film that has an absorption axis in a thickness direction in this order, thereby completing the present invention.

That is, the present inventors found that the object can be achieved with the following configurations.

[1] A transparent screen comprising, in this order:
a first $\lambda/4$ plate;
a reflecting layer that has a structure obtained by immobilizing a cholesteric liquid crystalline phase and reflects a part of incidence light; and
a polarizing film that has an absorption axis in a thickness direction.

[2] The transparent screen according to [1], further comprising:
a second $\lambda/4$ plate that is provided between the reflecting layer and the polarizing film.

[3] The transparent screen according to [2],
in which a slow axis of the first $\lambda/4$ plate and a slow axis of the second $\lambda/4$ plate are perpendicular to each other.

[4] The transparent screen according to any one of [1] to [3],
in which the reflecting layer has a structure in which reflecting dots obtained by immobilizing a cholesteric liquid crystalline phase are two-dimensionally arranged, and
the reflecting dots are convex on the first $\lambda/4$ plate side.

[5] The transparent screen according to any one of [1] to [4],
in which the polarizing film has a structure in which a dichromatic colorant is homeotropically aligned.

[6] An image display system comprising:
the transparent screen according to any one of [1] to [5]; and
a short focal length projector that projects light from the first $\lambda/4$ plate side to the transparent screen,
in which light emitted from the short focal length projector is linearly polarized light.

According to the present invention, it is possible to realize: a transparent screen having high transparency in which a hot spot caused by transmitted light can be reduced; and an image display system including the transparent screen in which a hot spot caused by transmitted light is reduced

DESCRIPTION OF THE PREFERRED EMBODIMENTS

Figure 1:
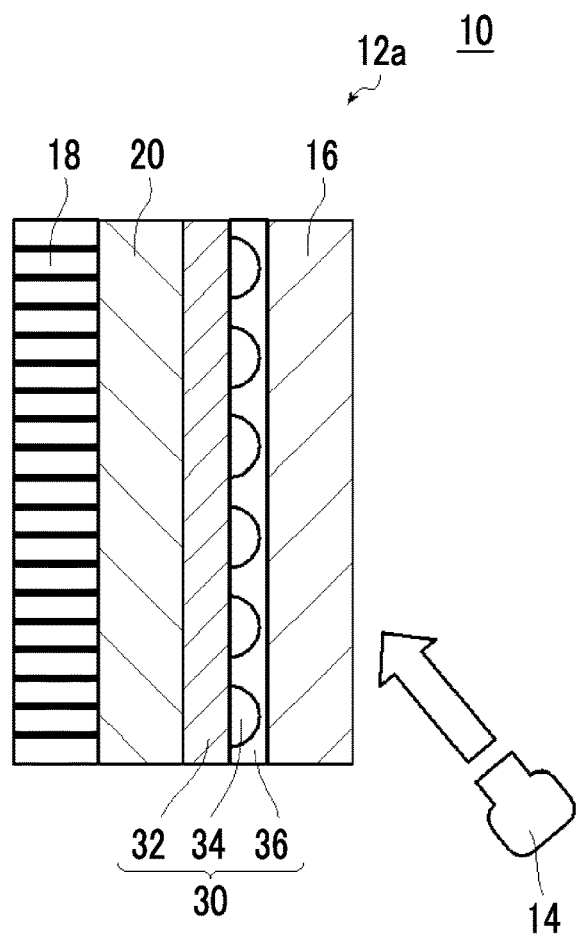
FIG. 1 is a diagram conceptually showing an example of an image display system according to an embodiment of the present invention.

Hereinafter, a transparent screen and an image display system according to the present invention will be described in detail based on a preferable embodiment shown in the accompanying drawings.

In this specification, numerical ranges represented by "to" include numerical values before and after "to" as lower limit values and upper limit values.

In this specification, for example, unless specified otherwise, an angle such as "45°", "parallel", "perpendicular", or "orthogonal" represents that a difference from an exact angle is less than 5°. The difference from an exact angle is preferably less than 4° and more preferably less than 3°.

In this specification, "(meth)acrylate" represents "either or both of acrylate and methacrylate".

In this specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

In this specification, visible light refers to light which can be observed by human eyes among electromagnetic waves and refers to light in a wavelength range of 380 nm to 780 nm. Invisible light refers to light in a wavelength range of shorter than 380 nm or longer than 780 nm.

In addition, although not limited thereto, in visible light, light in a wavelength range of 420 nm to 490 nm refers to blue light, light in a wavelength range of 495 nm to 570 nm refers to green light, and light in a wavelength range of 620 nm to 750 nm refers to red light.

In this specification, retroreflection refers to reflection in which incident light is reflected in an incidence direction.

In this specification, "haze" refers to a value measured using a haze meter NDH-2000 (manufactured by Nippon Denshoku Industries Co., Ltd.).

Theoretically, haze refers to a value expressed by the following expression.

(Diffuse Transmittance of Natural Light at 380 nm to 780 nm)/(Diffuse Transmittance of Natural Light at 380 nm to 780 nm+Direct Transmittance of Natural Light)×100%

The diffuse transmittance refers to a value calculated by subtracting the direct transmittance from a total transmittance which is obtained using a spectrophotometer and an integrating sphere unit. The direct transmittance refers to a transmittance at 0° in a case where a value measured using an integrating sphere unit is used. That is, low haze represents that the amount of directly transmitted light in the total amount of transmitted light is large.

The refractive index refers to a refractive index with respect to light having a wavelength of 589.3 nm.

In this specification, Re ($\lambda$) and Rth ($\lambda$) represent an in-plane retardation and a thickness-direction retardation at a wavelength of $\lambda$, respectively. Unless specified otherwise, the wavelength $\lambda$ refers to 550 nm.

In this specification, Re ($\lambda$) and Rth ($\lambda$) are values measured at the wavelength $\lambda$ using AxoScan OPMF-1 (manufactured by Opto Science Inc.). By inputting an average refractive index ((Nx+Ny+Nz)/3)) and a thickness (d ($\mu$m) to AxoScan, the following expressions can be calculated.

Slow Axis Direction (°)

$Re(\lambda)=R0(\lambda)$ $Rth(\lambda)=((Nx+Ny)/2-Nz)\times d$

R0 ($\lambda$) is expressed as a numerical value calculated by AxoScan and represents Re ($\lambda$).

In this specification, the refractive indices Nx, Ny, and Nz are measured using an Abbe refractometer (NAR-4T, manufactured by Atago Co., Ltd.), and a sodium lamp ($\lambda$=589 nm) is used as a light source. In addition, the wavelength dependence can be measured using a combination of a multi-wavelength Abbe refractometer DR-M2 (manufactured by Atago Co., Ltd.) and an interference filter.

In addition, as the refractive index, values described in "Polymer Handbook" (John Wiley&Sons, Inc.) and catalogs of various optical films can also be used. The values of average refractive index of major optical films are as follows: cellulose acylate (1.48), cycloolefin polymer (1.52), polycarbonate (1.59), polymethyl methacrylate (1.49), and polystyrene (1.59).

In this specification, a selective reflection wavelength refers to an average value of two wavelengths at which, in a case where a minimum value of a transmittance of a target object (member) is represented by Tmin (%), a half value transmittance: T½ (%) represented by the following expression is exhibited.

Expression for obtaining Half Value Transmittance: T½=100−(100−Tmin)÷2

In addition, selective reflection wavelengths of a plurality of objects being "equal" does not represent that the selective reflection wavelengths are exactly equal, and error is allowed in a range where there are no optical effects. Specifically, selective reflection wavelengths of a plurality of objects being "equal" represents a difference between the selective reflection wavelengths of the respective objects is 20 nm or less, and this difference is preferably 15 nm or less and more preferably 10 nm or less.

A transparent screen according to an embodiment of the present invention comprises, in this order:

a first $\lambda$/4 plate;

a reflecting layer that has a structure obtained by immobilizing a cholesteric liquid crystalline phase and reflects a part of incidence light; and a polarizing film that has an absorption axis in a thickness direction.

In addition, an image display system according to an embodiment of the present invention comprises:

the transparent screen according to the embodiment of the present invention;

a short focal length projector that projects light from the first λ/4 plate side to the transparent screen, in which light emitted from the short focal length projector is linearly polarized light.

FIG. 1 conceptually shows an example of the image display system according to the embodiment of the present invention including an example of the transparent screen according to the embodiment of the present invention.

An image display system 10 shown in FIG. 1 includes: a transparent screen 12a according to the embodiment of the present invention; and a projector 14 of which outgoing light is linearly polarized light.

In the image display system 10, the transparent screen 12a has a configuration in which a first λ/4 plate 16, a reflecting layer 30, a second λ/4 plate 20, and a polarizing film 18 are laminated in this order. In order to clearly show the configuration of the transparent screen 12a, the first λ/4 plate 16, the second λ/4 plate 20, and a support 32 described below are indicated by oblique lines, and an absorption axis in the polarizing film 18 is schematically indicated by a thick line.

In the following description, unless specified otherwise, the same shall be applied not only to the transparent screen of the image display system 10 shown in FIG. 1 but also to various transparent screens according to the embodiment of the present invention used in various image display systems according to the embodiment of the present invention described below.

In addition, although not shown in the drawing, the first λ/4 plate 16 and the reflecting layer 30, and the second λ/4 plate 20 and the polarizing film 18 are bonded using bonding layers provided therebetween, respectively.

In the present invention, as the bonding layer, any bonding layer formed of one of well-known various materials can be used as long as it is a material that can bond a plate-shaped material (sheet-like material) as a target. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-like material in an optical device or an optical element, for example, an optical clear adhesive (OCA), an optically transparent double-sided tape, or an ultraviolet curable resin.

Alternatively, instead of bonding the layers using the bonding layers, the first λ/4 plate 16, the reflecting layer 30, the second λ/4 plate 20, and the polarizing film 18 may be laminated and held by a frame, a holding device, or the like to configure the transparent screen according to the embodiment of the present invention.

<<Reflecting Layer>>

The reflecting layer 30 includes: the support 32; reflecting dots 34 that are two-dimensionally arranged on one surface of the support 32; and an overcoat layer 36 that embeds the reflecting dots 34 and is laminated on the support 32.

<<Support>>

The support 32 included in the reflecting layer 30 supports the reflecting dots that are dots obtained by immobilizing a cholesteric liquid crystalline phase described below.

It is preferable that the reflectivity of the support 32 is low at a wavelength where the reflecting dots 34 reflect light, and it is preferable that the support 32 does not include a material which reflects light at a wavelength where the reflecting dots 34 reflect light.

In addition, it is preferable that the support 32 is transparent in a visible range. In addition, the support 32 may be colored. However, it is preferable that the support is not colored or the area of the support colored is small. Further, the refractive index of the support 32 is preferably about 1.2 to 2.0 and more preferably about 1.4 to 1.8.

"Transparent" described in this specification represents that the non-polarized light transmittance (total transmittance) at a wavelength of 380 nm to 780 nm is preferably 50% or higher, more preferably 70% or higher, and still more preferably 85% or higher.

In addition, a haze value of the support 32 is preferably 30% or lower, more preferably 0.1% to 25%, and still more preferably 0.1% to 10%. Further, by using the support 32 having a high haze such as an antiglare (AG) support, the haze value can be adjusted such that transparency deteriorates and front brightness and viewing angle characteristics are improved.

The thickness of the support 32 may be selected depending on the application without any particular limitation, and is preferably about 5 µm to 1000 µm, more preferably 10 µm to 250 µm, and still more preferably 15 µm to 150 µm.

Here, although described below, in the image display system including the transparent screen according to the embodiment of the present invention, a short focal length projector of which outgoing light is linearly polarized light is used as the projector, and circularly polarized light obtained by the λ/4 plate 16 is incident on the reflecting layer 30.

Accordingly, in this case, in order to maintain polarization, in the support 32 of the reflecting layer 30, it is preferable that Re (λ) and Rth (λ) are as low as possible.

Specifically, in the support 32, Re (550) is preferably 0 nm to 20 nm and more preferably 0 nm to 10 nm. In addition, in the support 32, Rth (550) is preferably 0 nm to 50 nm and more preferably 0 nm to 40 nm.

The support 32 may have a single-layer structure or a multi-layer structure. In a case where the support 32 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 32 has a multi-layer structure, examples thereof include a support including: one of the above-described supports having a single-layer structure that is provided as a substrate; and another layer that is provided on a surface of the substrate.

An underlayer may be provided between the support 32 and the reflecting dots 34 described below. The underlayer is preferably a resin layer and more preferably a transparent resin layer. Examples of the underlayer include a layer for adjusting the shape of the reflecting dot 34 during the formation of the reflecting dot 34, a layer for improving adhesion properties between the support 32 and the reflecting dots 34, and an aligned film for adjusting the alignment of a polymerizable liquid crystal compound during the formation of the reflecting dot 34.

In addition, it is preferable that the reflectivity of the underlayer is low at a wavelength where the reflecting dots 34 reflect light, and it is preferable that the underlayer does not include a material which reflects light at a wavelength where the reflecting dots 34 reflect light. In addition, it is preferable that the underlayer is transparent. Further, the refractive index of the underlayer is preferably about 1.2 to 2.0 and more preferably about 1.4 to 1.8. It is also preferable that the underlayer is a layer including a resin obtained by curing a composition including a polymerizable compound which is directly applied to a surface of the support 32. Examples of the polymerizable compound include a non-liquid crystal compound such as a (meth)acrylate monomer or a urethane monomer.

The thickness of the underlayer is not particularly limited and is preferably 0.01 μm to 50 μm and more preferably 0.05 μm to 20 μm.

<<Reflecting Dots>>

The reflecting dots 34 of the reflecting layer 30 reflect either right circularly polarized light or left circularly polarized light in a specific wavelength range, that is, at a selective reflection wavelength, and allow transmission of the other light components.

For example, the reflecting dots 34 may reflect red right circularly polarized light at a red wavelength range as the selective reflection wavelength and may allow transmission of the other light components as in the case of red right circularly polarized light reflecting dots 34rR included in a transparent screen 12c of FIG. 5 described below in detail, may reflect green right circularly polarized light at a green wavelength as the selective reflection wavelength and may allow transmission of the other light components as in the case of green right circularly polarized light reflecting dots 34gR, or may reflect blue right circularly polarized light at a blue wavelength as the selective reflection wavelength and may allow transmission of the other light components as in the case of blue right circularly polarized light reflecting dots 34bR. In addition, in the example shown in FIG. 5, the reflecting dots reflect right circularly polarized light at the selective reflection wavelength. However, the present invention is not limited to this configuration, and the reflecting dots may reflect left circularly polarized light at the selective reflection wavelength.

The reflecting dots are dots obtained by immobilizing a cholesteric liquid crystalline phase. That is, the reflecting dots are dots formed of a liquid crystal material having a cholesteric structure.

Here, the cholesteric liquid crystalline phase forming each of the reflecting dots has a stripe pattern including bright portions and dark portions in a cross-section of the reflecting dot in case of being observed with a scanning electron microscope. The reflecting dot includes a portion having a height which continuously increases to a maximum height in a direction moving from an end portion of the reflecting dot to the center of the reflecting dot. In this portion, an angle between a normal line perpendicular to a line, which is formed using a first dark portion from a surface of the reflecting dot opposite to the support 32, and the surface of the reflecting dot is preferably in a range of 70° to 90°.

This point will be described below.

In the reflecting layer 30, the reflecting dots 34 may be arranged regularly or irregularly as long as they are two-dimensionally arranged.

In addition, the arrangement density of the reflecting dots 34 in the reflecting layer 30 may be uniform over the entire surface, or the reflecting layer 30 may have regions having different arrangement densities.

Here, the arrangement density of the reflecting dots 34 in the reflecting layer 30 is not particularly limited and may be appropriately set depending on diffusibility (viewing angle), transparency, and the like required for the transparent screen.

For example, from the viewpoint of obtaining high transparency to obtain a wide viewing angle at which a hot spot can be suppressed and the viewpoint of obtaining an appropriate density or the like at which the reflecting dots can be manufactured without defects such as coalescence or deletion of the reflecting dots during manufacturing, in case of being seen from a normal direction perpendicular to a main surface of the support 32, an area ratio of the reflecting dots 34 with respect to the support 32 is preferably 1% to 90.6%, more preferably 2% to 50%, and still more preferably 4 to 30%.

The area ratio of the reflecting dots 34 may be obtained by obtaining an image using a microscope such as a laser microscope, a scanning electron microscope (SEM) or a transmission electron microscope (TEM), measuring area ratios in a region having a size of 1 mm×1 mm, and obtaining an average value of area ratios at, for example, five positions.

Likewise, from the viewpoint of suppressing a hot spot, the viewpoint of obtaining a wide viewing angle, and the viewpoint of obtaining high transparency, a pitch of adjacent reflecting dots 34 is preferably 20 μm to 500 μm, more preferably 20 μm to 300 μm, and still more preferably 20 μm to 150 μm. The pitch of the reflecting dots is the distance between the center of one reflecting dot and the center of another reflecting dot.

In the reflecting layer 30, the diameters and/or shapes of the reflecting dots 34 may be the same as or different from each other and is preferably the same as each other. For example, it is preferable that the reflecting dots 34 are formed under the same conditions for forming the reflecting dots having the same diameter and shape.

In this specification, the description of the reflecting dots is applicable to all the reflecting dots in the transparent screen according to the present invention. Further, it is allowable that the transparent screen according to the present invention including the above-described reflecting dots also includes a reflecting dot which deviates from the above description due to an error which is allowable in the technical field.

It is preferable that the reflecting dots 34 are circular in case of being observed from the normal direction (hereinafter, also referred to as "support normal direction") perpendicular to a main surface of the support 32. For example, the reflecting dots 34 are dots having a shape such as a hemispherical shape (substantially hemispherical shape), a spherical segment shape (substantially spherical segment shape), a spherical trapezoidal shape, a conical shape, or a truncated cone shape.

The circular shape is not necessarily a perfect circle and may be a substantially circular shape. The center of the reflecting dot 34 described herein refers to the center of the circle or the center of gravity. The reflecting dots 34 are not particularly limited as long as the average shape of the reflecting dots 34 is circular, and may include some reflecting dots having a shape other than a circular shape.

In case of being seen from the support normal direction, an average diameter of the reflecting dots 34 is preferably 10 μm to 200 μm and more preferably 20 μm to 120 μm.

The diameter of the reflecting dot 34 can be obtained by measuring the length of a line, which ranges from an end portion (an edge or a boundary of the reflecting dot) to another end portion and passes through the center of the reflecting dot 34, in an image obtained using a microscope such as a laser microscope, a scanning electron microscope (SEM), or a transmission electron microscope (TEM). The number of reflecting dots 34 and the distance between reflecting dots can be obtained from a microscopic image obtained using a laser microscope, a scanning electron microscope, or a transmission electron microscope.

In a case where a reflecting dot 34 has a shape other than a circular shape in case of being seen from the support normal direction, the diameter (equivalent circle diameter) of a circle having an area equal to the projected area of the reflecting dot 34 is obtained as the diameter of the reflecting dot 34.

The average diameter is obtained by measuring diameters of 10 selected reflecting dots 34 using the above-described method and obtaining an average value thereof.

The height of the reflecting dot 34 can be obtained from a cross-sectional view of the reflecting dot 34 which is obtained by focal position scanning using a laser microscope or obtained using a microscope such as a SEM or a TEM.

The average maximum height of the reflecting dots 34 is preferably 1 μm to 40 μm, more preferably 3 μm to 30 μm, and still more preferably 5 μm to 20 μm.

<<<Optical Characteristics of Reflecting Dots>>>

The reflecting dots 34 have wavelength selective reflecting properties.

Basically, the transparent screen according to the embodiment of the present invention is used as a screen that can observe an image which is formed by image light emitted from the short focal length projector 14 and a background on a back surface side of the transparent screen in an overlapping manner. Therefore, light where the reflecting dots 34 exhibit selective reflecting properties is preferably visible light and is preferably selected according to a wavelength of light emitted from the short focal length projector 14.

For example, in a case where the light emitted from the short focal length projector 14 is green, the selective reflection wavelength of the reflecting dots 34 may be a green wavelength range.

As described above, the reflecting dots 34 are dots obtained by immobilizing a cholesteric liquid crystalline phase.

The wavelength of light where the reflecting dots 34 exhibit selective reflecting properties can be adjusted (selected) by adjusting a helical pitch in the cholesteric liquid crystalline phase which forms the reflecting dots 34.

In addition, in the cholesteric liquid crystalline phase which forms the reflecting dots 34 in the transparent screen according to the embodiment of the present invention, a helical axis direction is adjusted as described below. Therefore, light incident on the reflecting dots includes not only specularly reflected light but also light reflected in various directions.

In addition, the reflecting dots 34 may be colored. However, it is preferable that the reflecting dots are not colored or the area of the reflecting dots colored is small. As a result, the transparency of the transparent screen can be improved.

<<<Cholesteric Liquid Crystalline Phase>>>

It is known that the cholesteric liquid crystalline phase exhibits selective reflecting properties at a specific wavelength. A center wavelength λ of the selective reflection depends on a pitch P (=helical cycle) of a helical structure in the cholesteric liquid crystalline phase and complies with an average refractive index n of the cholesteric liquid crystalline phase and a relationship of λ=n×P. Therefore, the selective reflection wavelength can be adjusted by adjusting the pitch of the helical structure. The pitch of the cholesteric liquid crystalline phase depends on the kind of a chiral agent which is used in combination of a polymerizable liquid crystal compound, or the concentration of the chiral agent added. Therefore, a desired pitch can be obtained by adjusting the kind and concentration of the chiral agent.

The details of the adjustment of the pitch can be found in "Fuji Film Research&Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase has a stripe pattern including bright portions and dark portions in a cross-sectional view of the reflecting dot in case of being observed with a scanning electron microscope. Two bright portions and two dark portions correspond to one helical pitch. Based on the above fact, the pitch can be measured from the SEM cross-sectional view. In the reflecting dot, a normal line perpendicular to each line of the stripe pattern is the helical axis direction of the cholesteric liquid crystalline phase.

Reflected light of the cholesteric liquid crystalline phase is circularly polarized light. That is, in the transparent screen 12a according to the embodiment of the present invention, the reflecting dots 34 of the reflecting layer 30 reflect circularly polarized light. Whether or not the reflected light is right circularly polarized light or left circularly polarized light is determined depending on a helical twisting direction of the cholesteric liquid crystalline phase. Regarding the selective reflection of the circularly polarized light by the cholesteric liquid crystalline phase, in a case where the helical twisting direction of the cholesteric liquid crystalline phase is right, right circularly polarized light is reflected, and in a case where the helical twisting direction of the cholesteric liquid crystalline phase is left, left circularly polarized light is reflected.

Figure 5:
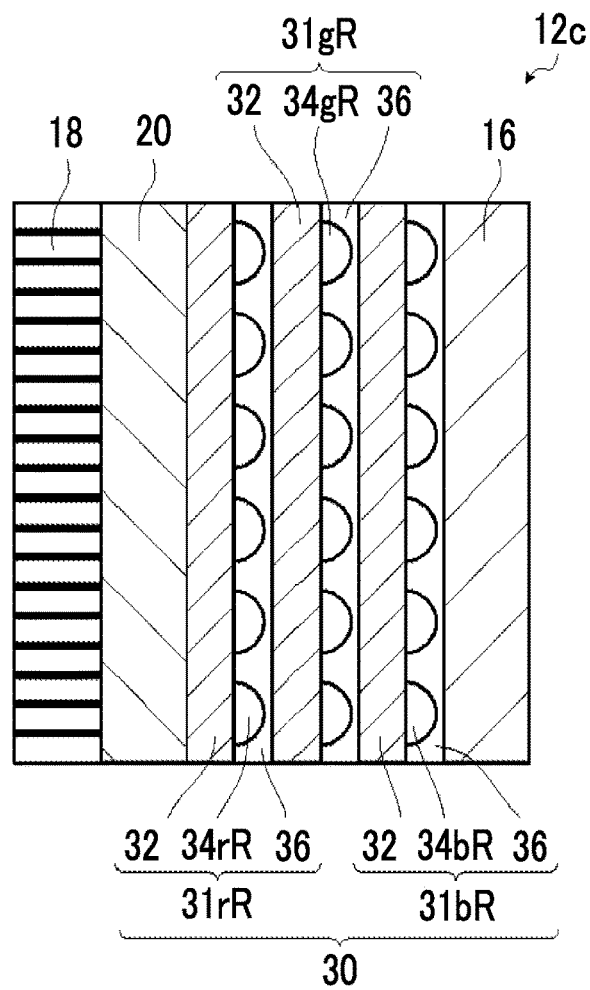
FIG. 5 is a diagram conceptually showing still another example of the transparent screen according to the embodiment of the present invention.

Accordingly, in the transparent screen 12c in the example shown in FIG. 5, the red right circularly polarized light reflecting dots 34rR, the green right circularly polarized light reflecting dots 34gR, and the blue right circularly polarized light reflecting dots 34bR are dots obtained by immobilizing a right-twisted cholesteric liquid crystal phase.

A direction of rotation of the cholesteric liquid crystalline phase can be adjusted by adjusting a kind of a liquid crystal compound for forming the reflecting dots (reflecting layer) and a kind of a chiral agent to be added.

In addition, a full width at half maximum Δλ (nm) of a selective reflection range (circularly polarized light reflection range) where selective reflection is exhibited depends on Δn of the cholesteric liquid crystalline phase and the helical pitch P and complies with a relationship of Δλ=Δn×P. Therefore, the width of the selective reflection range can be controlled by adjusting Δn. Δn can be adjusted by adjusting a kind of a liquid crystal compound for forming the reflecting dots and a mixing ratio thereof, and a temperature during alignment immobilization. The full width at half maximum of the reflection wavelength range is adjusted depending on the application of the transparent screen and is, for example, 50 nm to 500 nm and preferably 100 nm to 300 nm.

The reflecting dot 34 obtained by immobilizing a cholesteric liquid crystalline phase has a stripe pattern including bright portions and dark portions in a cross-sectional thereof. In a case where the cross-sectional view of the reflecting dot 34 obtained by immobilizing a cholesteric liquid crystalline phase is observed with a scanning electron microscope, an angle between a normal line perpendicular to a line, which is formed using a first dark portion from a surface of the reflecting dot 34 opposite to the support 32, and the surface of the reflecting dot 34 opposite to the support 32 is preferably in a range of 70° to 90°.

In the following description, "the surface of the reflecting dot opposite to the support" will also simply referred to as "the surface of the reflecting dot".

Figure 2:
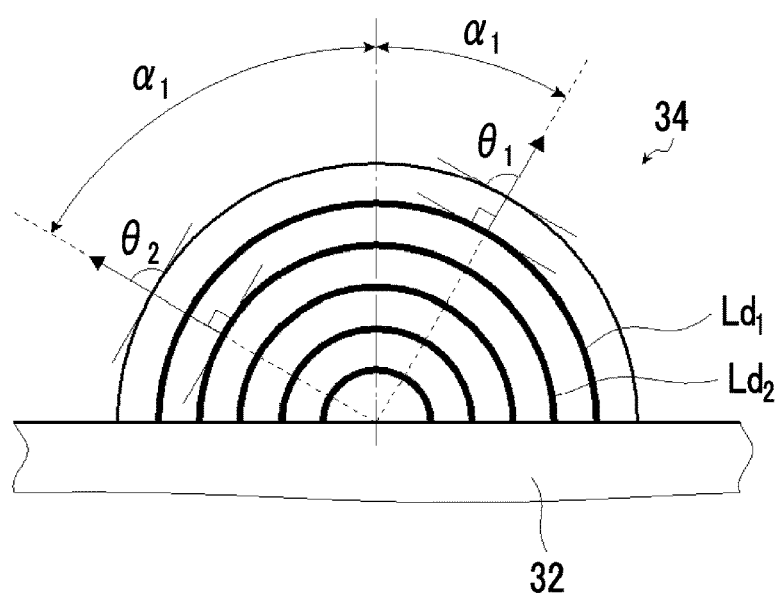
FIG. 2 is a conceptual diagram showing an action of the transparent screen according to the embodiment of the present invention.

FIG. 2 shows a schematic diagram of the cross-section of the reflecting dot 34. In FIG. 2, lines which are formed using the dark portions are indicated by thick lines. As shown in FIG. 2, an angle $\theta_1$ between a normal line (broken line) perpendicular to a line $Ld_1$, which is formed using the first dark portion, and the surface of the reflecting dot is preferably 70° to 90°.

Here, in a case where a position of the surface of the reflecting dot 34 is represented by an angle $\alpha_1$ with respect to a line (chain line) perpendicular to the surface of the support 32 which passes through the center of the reflecting dot 34, it is preferable that, at a position where the angle $\alpha_1$ is 30° and a position where the angle $\alpha_1$ is 60°, the angle between the normal line perpendicular to the line $Ld_1$, which is formed using the first dark portion from the surface of the reflecting dot 34, and the surface of the reflecting dot 34 is preferably in a range of 70° to 90°, and it is more preferable that, at all the positions of the surface of the reflecting dot 34, the angle between the normal line perpendicular to the line $Ld_1$, which is formed using the first dark portion from the surface of the reflecting dot 34, and the surface of the reflecting dot 34 is preferably in a range of 70° to 90°.

That is, it is preferable that the angle satisfies the above-described range at some positions of the surface of the reflecting dot 34. For example, it is preferable that the angle satisfies the above-described range not intermittently but continuously at some positions of the surface of the reflecting dot 34. In a case where the surface of the reflecting dot 34 is curved in a cross-sectional view, the angle between the normal line perpendicular to the line, which forms the dark portion, and the surface of the reflecting dot 34 refers to an angle between a tangent line of the surface of the reflecting dot 34 and the normal line. In addition, the angle between the normal line and the surface of the reflecting dot 34 is expressed by an acute angle and is in a range of 70° to 110° in case of being expressed by an angle of 0° to 180°.

In a cross-sectional view of the reflecting dot 34, it is preferable that an angle $\theta_2$ between a normal line perpendicular to a line $Ld_2$, which is formed using a second dark portion from the surface of the reflecting dot 34, and the surface of the reflecting dot 34 is preferably in a range of 70° to 90°, it is more preferable that an angle $\theta$ between a normal line perpendicular to each of lines, which are formed using third and fourth dark portions from the surface of the reflecting dot 34, and the surface of the reflecting dot 34 is preferably in a range of 70° to 90°, and it is still more preferable that an angle $\theta$ between a normal line perpendicular to each of lines, which are formed using fifth to twelfth dark portions from the surface of the reflecting dot 34, and the surface of the reflecting dot 34 is preferably in a range of 70° to 90°.

Further, the angle between the normal line perpendicular to the line, which is formed using the dark portion, and the surface of the reflecting dot 34 is more preferably 80° to 90° and still more preferably 85° to 90°.

The cross-sectional view of the reflecting dot 34 observed with a SEM shows that an angle between the helical axis of the cholesteric liquid crystalline phase and the surface of the reflecting dot 34 (or a tangent line thereof) is in a range of 70° to 90°.

Due to the above-described structure, light incident on the reflecting dot 34 in a direction with an angle from a normal direction perpendicular to the support 32 can be made to be incident at an angle, which is substantially parallel to the helical axis direction of the cholesteric liquid crystalline phase, on the surface of the reflecting dot 34. Therefore, light which is incident on the reflecting dot 34 can be reflected in various directions.

In addition, the reflecting dot 34 specularly reflects incidence light with respect to the helical axis of the cholesteric liquid crystalline phase. Therefore, as conceptually shown in FIG. 3, light In is incident from the normal direction perpendicular to the support 32, whereas reflected light Ir reflected from the vicinity of the reflecting dot 34 is reflected parallel to the normal direction perpendicular to the support. On the other hand, at a position which deviates from the center of the reflecting dot 34 (a position where the helical axis of the cholesteric liquid crystalline phase is inclined with respect to the normal direction perpendicular to the support 32), the reflected light Ir is reflected in a direction different from the normal direction perpendicular to the support 32. Accordingly, light which is incident on the reflecting dot 34 can be reflected in various directions, and the viewing angle can be widened. In addition, light Ip which is transmitted through the reflecting dot 34 is transmitted in the same direction as that of the incidence light In. Therefore, the scattering of the transmitted light can be suppressed to reduce the haze, and the transparency can be improved.

In addition, it is preferable that light incident from the normal direction perpendicular to the support 32 can be reflected in all the directions. In particular, it is preferable that an angle (half power angle) in which the brightness is half of the front brightness (peak brightness) can be made to be 35° or more and that high reflecting properties are exhibited.

It is preferable that, by making the helical axis of the cholesteric liquid crystalline phase to form an angle of 70° to 90° with the surface of the reflecting dot 34, an angle between a normal direction perpendicular to a line, which is formed using a first dark portion from the surface, and a normal direction perpendicular to the support continuously decreases along with a continuous increase in the height.

The cross-sectional view is a cross-sectional view of a surface in any direction including a portion having a height which continuously increases to a maximum height in a direction moving from an end portion of the dot to the center of the dot. Typically, the cross-sectional view may be a cross-sectional view of any surface which includes the center of the dot and is perpendicular to the support.

<<<Method of Preparing Reflecting Dots>>>

The reflecting dots 34 can be obtained by immobilizing a cholesteric liquid crystalline phase in a dot shape.

The structure in which a cholesteric liquid crystalline phase is immobilized may be a structure in which the alignment of the liquid crystal compound as a cholesteric liquid crystal phase is immobilized. Typically, the structure in which a cholesteric liquid crystal phase is immobilized may be a structure which is obtained by making the polymerizable liquid crystal compound to be in a state where a cholesteric liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the aligned state is not changed by an external field or an external force.

The structure in which a cholesteric liquid crystalline phase is immobilized is not particularly limited as long as the optical characteristics of the cholesteric liquid crystalline phase are maintained, and the liquid crystal compound does not necessarily exhibit liquid crystallinity. For example, the molecular weight of the polymerizable liquid crystal compound may be increased by a curing reaction such that the liquid crystallinity thereof is lost.

Examples of a material used for forming the reflecting dots 34 obtained by immobilizing a cholesteric liquid crystalline phase include a liquid crystal composition including a liquid crystal compound. It is preferable that the liquid crystal compound is a polymerizable liquid crystal compound.

It is preferable that the liquid crystal composition including a liquid crystal compound for forming the reflecting dots 34 further includes a surfactant. In addition, the liquid crystal composition used for forming the reflecting dots 34 may further include a chiral agent and a polymerization initiator.

—Polymerizable Liquid Crystal Compound—

The polymerizable liquid crystal compound may be a rod-shaped liquid crystal compound or a disk-shaped liquid crystal compound and is preferably a rod-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanophenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770, 107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

Specific examples of the polymerizable liquid crystal compound include compounds represented by the following Formulae (1) to (11).

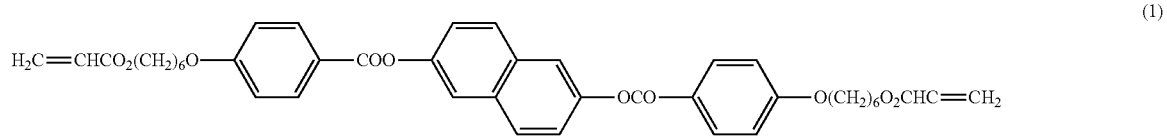

(1)

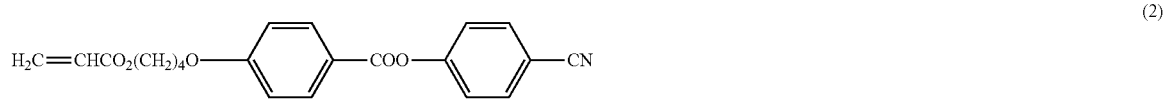

(2)

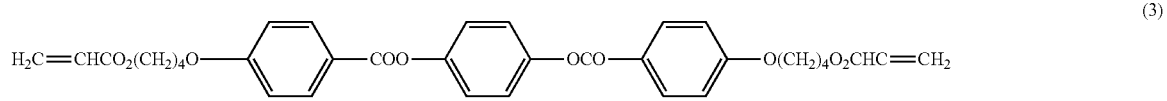

(3)

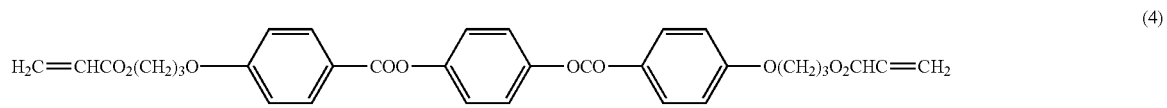

(4)

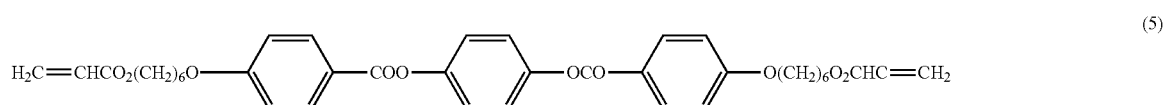

(5)

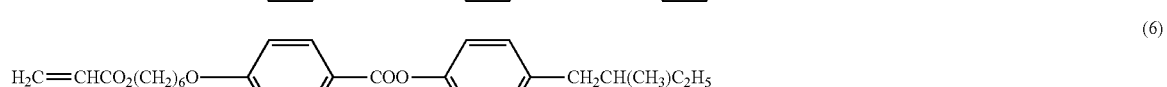

(6)

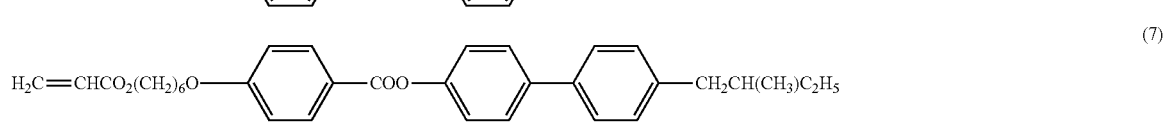

(7)

-continued

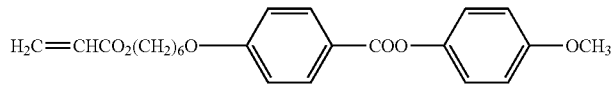

(8)

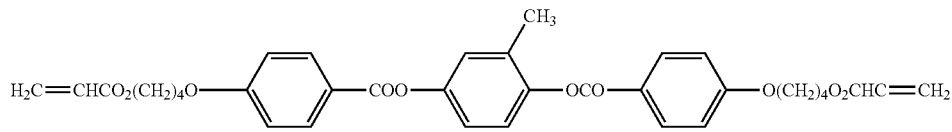

(9)

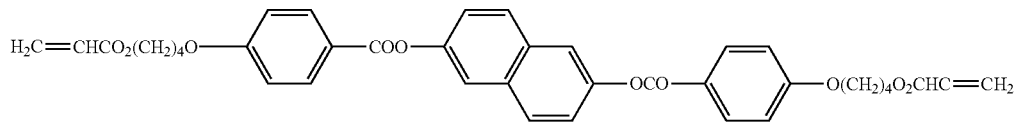

(10)

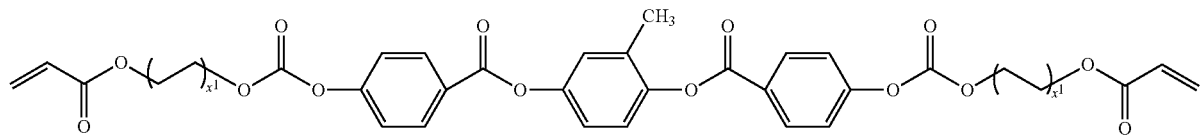

(11)

[In Compound (11), $X^1$ represents 2 to 5 (integer).]

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

The present inventors found that, by adding the surfactant to the liquid crystal composition during the formation of the reflecting dot, the polymerizable liquid crystal compound is aligned to be parallel to an air interface side, and the helical axis direction of the reflecting dot is controlled as described above.

In general, for the formation of the dot, it is necessary that the surface tension is not decreased to maintain a liquid droplet shape during printing. Therefore, it is surprising that the reflecting dot can be formed even after the addition of the surfactant and that the reflecting dot exhibits high retroreflection properties in multiple directions. According to the investigation of the present inventors, in a case where the surfactant is used, a reflecting dot is formed such that an angle between the surface of the reflecting dot and the support 32 in an end portion of the reflecting dot is 40° or higher. That is, by adding the surfactant during the formation of the reflecting dot, the contact angle between the reflecting dot and the support 32 can be formed in an angle range where a wide viewing angle and high transparency can be simultaneously realized.

It is preferable that the surfactant is a compound which can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As a horizontal alignment agent, one kind may be used alone, or two or more kinds may be used in combination.

As the fluorine surfactant, a compound represented by the following Formula (I) described in paragraphs "0082" to "0090" of JP2014-119605A is preferable.

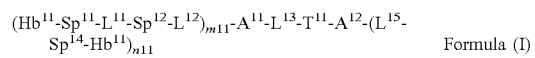

Formula (I)

In Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (in Formula (I), R represents a hydrogen atom or an alkyl group having 1 to 6 carbon atoms). —NRCO— or —CONR— has an effect of reducing solubility and is likely to increase haze during the preparation of the dot. From this viewpoint, —O—, —S—, —CO—, —COO—, —OCO—, —COS— or —SCO— is more preferable. From the viewpoint of the stability of the compound, —O—, —CO—, —COO—, or —OCO— is more preferable. The alkyl group represented by R may be linear or branched. An alkyl group having 1 to 3 carbon atoms is more preferable, and examples thereof include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, more preferably a single bond or an alkylene group having 1 to 7 carbon atoms, and still more preferably a single bond or an alkylene group having 1 to 4 carbon atoms. However, a hydrogen atom in the alkylene group may be substituted with a fluorine atom. The alkylene group may have a branch or not, and a linear alkylene group having no branch is preferable. From the viewpoint of synthesis, it is preferable that $Sp^{11}$ and $Sp^{14}$ are the same and $Sp^{12}$ and $Sp^{13}$ are the same.

$A^{11}$ and $A^{12}$ represent a monovalent to tetravalent aromatic hydrocarbon group. The number of carbon atoms in the aromatic hydrocarbon group is preferably 6 to 22, more preferably 6 to 14, still more preferably 6 to 10, and still more preferably 6. The aromatic hydrocarbon group represented by $A^{11}$ or $A^{12}$ may have a substituent. Examples of the substituent include an alkyl group having 1 to 8 carbon atoms, an alkoxy group, a halogen atom, a cyano group, and an ester group. The description and preferable ranges of the groups can be found in the corresponding description of T described below. Examples of a substituent with which the aromatic hydrocarbon group represented by $A^{11}$ or $A^{12}$ is substituted include a methyl group, an ethyl group, a methoxy group, an ethoxy group, a bromine atom, a chlorine atom, and a cyano group. A molecule including a large amount of a perfluoroalkyl portion can cause liquid crystal to be aligned even in a small addition amount, which leads to reduction in haze. Therefore, in order for the molecule to include many perfluoroalkyl groups, it is preferable that $A^{11}$ and $A^{12}$ are tetravalent. From the viewpoint of synthesis, it is preferable that $A^{11}$ and $A^{12}$ are the same.

$T^{11}$ represents a divalent group or a divalent heterocyclic group preferably represented by any one of the following formulae (X in $T^{11}$ represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms),

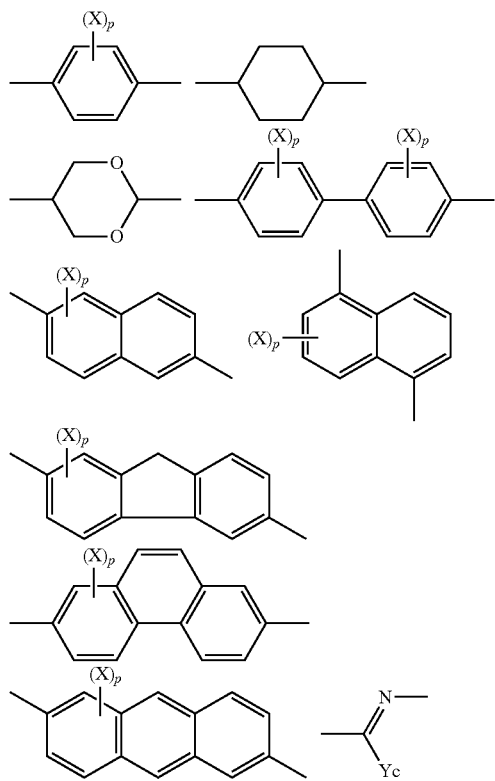

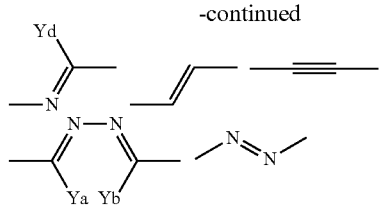

more preferably represented by any one of the following formulae,

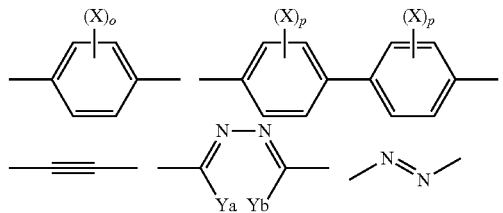

still more preferably represented by any one of the following formulae.

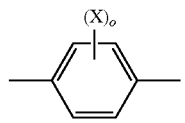

The number of carbon atoms in the alkyl group represented by X in $T^{11}$ is 1 to 8, preferably 1 to 5, and more preferably 1 to 3. The alkyl group may be linear, branched, or cyclic and is preferably linear or branched. Preferable examples of the alkyl group include a methyl group, an ethyl group, an n-propyl group, and an isopropyl group. Among these, a methyl group is preferable. The details of an alkyl portion of the alkoxy group represented by X in $T^{11}$ can be found in the description and preferable range of the alkyl group represented by X in $T^{11}$. Examples of the halogen atom represented by X in $T^{11}$ include a fluorine atom, a chlorine atom, a bromine atom, and an iodine atom. Among these, a chlorine atom or a bromine atom is preferable. Examples of the ester group represented by X in $T^{11}$ include a group represented by R'COO—. R' represents, for example, an alkyl group having 1 to 8 carbon atoms. The description and preferable range of the alkyl group represented by R' can be found in the description and preferable range of the alkyl group represented by X in $T^{11}$. Specific examples of the ester include $CH_3COO$— and $C_2H_5COO$—. The alkyl group having 1 to 4 carbon atoms represented by Ya, Yb, Yc, or Yd may be linear or branched. Examples of the alkyl group having 1 to 4 carbon atoms include a methyl group, an ethyl group, an n-propyl group, and an isopropyl group.

It is preferable that the divalent heterocyclic group has a 5-membered, 6-membered, or 7-membered heterocycle. A 5-membered or 6-membered heterocycle is more preferable, and a 6-membered heterocycle is most preferable. As a heteroatom constituting the heterocycle, a nitrogen atom, an oxygen atom, or a sulfur atom is preferable. It is preferable that the heterocyclic group is an aromatic heterocyclic group. Examples of the heterocycle include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thin ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. The description and preferable range of the substituent can be found in the description of the substituent with which the monovalent to tetravalent aromatic hydrocarbon represented by $A^1$ or $A^2$ is substituted.

$Hb^{11}$ represents a perfluoroalkyl group having 2 to 30 carbon atoms, more preferably a perfluoroalkyl group having 3 to 20 carbon atoms, and still more preferably a perfluoroalkyl group having 3 to 10 carbon atoms. The perfluoroalkyl group may be linear, branched, or cyclic and is preferably linear or branched and more preferably linear.

m11 and n11 each independently represent 0 to 3 and m11+n11≥1. At this time, a plurality of structures in parentheses may be the same as or different from each other and is preferably the same as each other. m11 and n11 in Formula (I) are determined depending on the valences of $A^{11}$ and $A^{12}$, and preferable ranges thereof are determined depending on the preferable ranges of the valences of $A^{11}$ and $A^{12}$.

o and p in $T^{11}$ each independently represent an integer of 0 or more. In a case where o and p represent an integer of 2 or more, a plurality of X's may be the same as or different from each other. o in $T^{11}$ represents preferably 1 or 2. p in $T^{11}$ represents preferably an integer of 1 to 4 and more preferably 1 to 2.

A molecular structure of the compound represented by Formula (I) may be symmetrical or non-symmetrical. "Symmetry" described herein represents at least one of point symmetry, line symmetry, or rotational symmetry, and "non-symmetry" described herein does not represent any one of point symmetry, line symmetry, or rotational symmetry.

The compound represented by Formula (I) is a combination of the perfluoroalkyl group ($Hb^{11}$), the linking groups -$Sp^{11}$-$L^{11}$-$Sp^{12}$-$L^{12})_{m_{11-A}}$-$L^{13}$- and -$L^{14}$-$A^{12}$-($L^{15}$-$Sp^{13}$-$L^{16}$-$Sp^{14}$-)$_{n_{11}}$-, and preferably the divalent group having an excluded volume effect which is represented by T. Two perfluoroalkyl groups ($Hb^{11}$) present in the molecule are preferably the same as each other, and the linking groups -(-$Sp^{11}$-$L^{11}$-$Sp^{12}$-$L^{12})_{m_{11}}$-$A^{11}$-$L^{13}$- and -$L^{14}$-$A^{12}$-($L^{15}$-$Sp^{13}$-$L^{16}$-$Sp^{14}$-)$_{n_{11}}$- present in the molecule are also preferably the same as each other. $Hb^{11}$-$Sp^{11}$-$L^{11}$-$Sp^{12}$- and -$Sp^{13}$-$L^{16}$-$Sp^{14}$-$Hb^{11}$ present at the terminal are preferably a group represented by any one of the following formulae:

$(C_aF_{2a+1})—(C_bH_{2b})—;$ $(C_aF_{2a+1})—(C_bH_{2b})—O—(C_rH_{2r})—;$ $(C_aF_{2a+1})—(C_bH_{2b})—COO—(C_rH_{2r})—;$ and $(C_aF_{2a+1})—(C_bH_{2b})—OCO—(C_rH_{2r})—.$ In the above formulae, a represents preferably 2 to 30, more preferably 3 to 20, and still more preferably 3 to 10. b represents preferably 0 to 20, more preferably 0 to 10, and still more preferably 0 to 5. a+b represents 3 to 30. r represents preferably 1 to 10 and more preferably 1 to 4.

In addition, $Hb^{11}$-$Sp^{11}$-$L^{11}$-$Sp^{12}$-$L^{12}$- and -$L^{15}$-$Sp^{13}$-$L^{16}$-$Sp^{14}$-$Hb^{11}$ present at the terminal of Formula (I) are preferably a group represented by any one of the following formulae:

$(C_aF_{2a+1})—(C_bH_{2b})—O—;$ $(C_aF_{2a+1})—(C_bH_{2b})—COO—;$ $(C_aF_{2a+1})—(C_bH_{2b})—O—(C_rH_{2r})—O—;$ $(C_aF_{2a+1})—(C_bH_{2b})—COO—(C_rH_{2r})—COO—;$ and $(C_aF_{2a+1})—(C_bH_{2b})—OCO—(C_rH_{2r})—COO—.$ In the above formulae, a, b, and r have the same definitions as described above.

The addition amount of the surfactant in the liquid crystal composition is preferably 0.01 to 10 mass %, more preferably 0.01 to 5 mass %, and still more preferably 0.02 to 1 mass % with respect to the total mass of the polymerizable liquid crystal compound.

—Chiral Agent (Optically Active Compound)—

The chiral agent has a function of causing a helical structure of a cholesteric liquid crystalline phase to be formed. The chiral compound may be selected depending on the purpose because a helical twisting direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a surface asymmetric compound not having an asymmetric carbon atom can also be used as a chiral agent. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by photomask exposure of an actinic ray or the like after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by the following Formula (12).

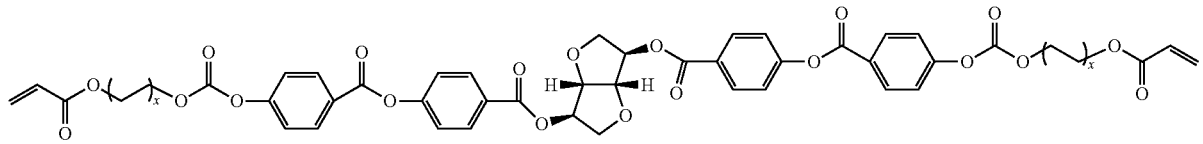

(12)

In the formula, X represents 2 to 5 (integer).

The content of the chiral agent in the liquid crystal composition is preferably 0.01 mol % to 200 mol % and more preferably 1 mol % to 30 mol % with respect to the amount of the polymerizable liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the polymerizable liquid crystal compound.

—Crosslinking Agent—

In order to improve the film hardness after curing and to improve durability, the liquid crystal composition may include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

In a case where an ink jet method described below is used for forming the reflecting dot, the liquid crystal composition may include a monofunctional polymerizable monomer in order to obtain generally required ink properties. Examples of the monofunctional polymerizable monomer include 2-methoxyethyl acrylate, isobutyl acrylate, isooctyl acrylate, isodecyl acrylate, and octyl/decyl acrylate.

In addition, optionally, a polymerization inhibitor, an antioxidant, an ultraviolet absorber, a light stabilizer, a colorant, metal oxide particles or the like can be added to the liquid crystal composition in a range where optical performance and the like do not deteriorate.

It is preferable that the liquid crystal composition is used as a liquid during the formation of the reflecting dot.

The liquid crystal composition may include a solvent. The solvent is not particularly limited and can be appropriately selected depending on the purpose. An organic solvent is preferably used.

The organic solvent is not particularly limited and can be appropriately selected depending on the purpose. Examples of the organic solvent include a ketone such as methyl ethyl ketone or methyl isobutyl ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden. The above-described component such as the above-described monofunctional polymerizable monomer may function as the solvent.

The liquid crystal composition is applied to the support 32 in a dot shape and then is cured to form a reflecting dot 34.

During the formation of the reflecting dot 34, the application of the liquid crystal composition to the support 32 is preferably performed by jetting. The printing method is not particularly limited and, for example, an ink jet method, a gravure printing method, or a flexographic printing method can be used. Among these, an ink jet method is preferable. The pattern of the reflecting dots can also be formed using a well-known printing technique.

The liquid crystal composition applied to the support 32 is optionally dried or heated and then is cured to form the reflecting dot 34. In the drying and/or heating step, the polymerizable liquid crystal compound in the liquid crystal composition only has to be aligned. In the case of heating, the heating temperature is preferably 200° C. or lower and more preferably 130° C. or lower.

The aligned liquid crystal compound may be further polymerized. Regarding the polymerization, thermal polymerization or photopolymerization using light irradiation may be performed, and photopolymerization is preferable. Regarding the light irradiation, ultraviolet light is preferably used. The irradiation energy is preferably 10 to 3000 J/cm$^2$ and more preferably 100 to 1500 mJ/cm$^2$. In order to promote a photopolymerization reaction, light irradiation may be performed under heating conditions or in a nitrogen atmosphere. The wavelength of irradiated ultraviolet light is preferably 250 nm to 430 nm. From the viewpoint of stability, the polymerization degree is preferably high, and is preferably 70% or higher and more preferably 80% or higher.

The polymerization degree can be determined by obtaining a consumption ratio between polymerizable functional groups using an infrared (IR) absorption spectrum.

<<Overcoat Layer>>

The reflecting layer 30 includes the overcoat layer 36 that embeds the reflecting dots 34 and is laminated on the support 32.

The overcoat layer 36 is not particularly limited as long as it is provided on the surface of the support 32 where the reflecting dots 34 are formed, and it is preferable that the surface of the reflecting layer is smoothened.

The overcoat layer 36 is not particularly limited, it is preferable that a difference in refractive index between the overcoat layer 36 and the reflecting dot 34 is as low as possible, and the difference in refractive index is preferably 0.04 or lower. Since the refractive index of the reflecting dot 34 is about 1.6, it is preferable that the overcoat layer 36 is a resin layer having a refractive index of about 1.4 to 1.8.

By using the overcoat layer 36 having a refractive index similar to the refractive index of the reflecting dot 34, the angle (polar angle) of light incident on the reflecting dot 34 from the normal line can be reduced. For example, in a case where the overcoat layer 36 having a refractive index of 1.6 is used and light is incident on the transparent screen at a polar angle of 45°, a polar angle at which light is actually incident on the reflecting dot 34 can be made to be about 27°. Therefore, by using the overcoat layer 36, the polar angle of light at which the transparent screen 12a exhibits retroreflection properties can be widened, and high retroreflection properties can be obtained at a wider angle even in a case where the angle between the surface of the reflecting dot 34 and the support 32 is small. In addition, the overcoat layer 36 may function as an antireflection layer or a hard coat layer.

Examples of the overcoat layer 36 include a resin layer which is obtained by applying a composition including a monomer to the surface of the support 32 where the reflecting dots 34 are formed, and curing the coating film.

A resin used for the overcoat layer 36 is not particularly limited and may be selected in consideration of the adhesiveness between the support 32 and the reflecting dots 34 or the like. For example, a thermoplastic resin, a thermosetting resin, or an ultraviolet curable resin can be used. From the viewpoints of durability, solvent resistance, and the like, a resin which is curable by crosslinking is preferable, and an ultraviolet curable resin which is curable within a short period of time is more preferable. Examples of the monomer which can be used for forming the overcoat layer 36 include ethyl (meth)acrylate, ethylhexyl (meth)acrylate, styrene, methylstyrene, N-vinylpyrrolidone, polymethylol propane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat layer 36 may be selected depending on the maximum height of the reflecting dot 34 without any particular limitation, and is preferably about 5 μm to 100 μm, more preferably 10 μm to 50 μm, and still more preferably 20 μm to 40 μm. The thickness is the distance from a surface of the support, where the dots are formed, to a surface of the overcoat layer provided on a surface of the support, where the dots are not formed, which is opposite to the surface where the dots are formed.

<First λ/4 Plate and Second λ/4 Plate>

The first λ/4 plate 16 is laminated on a surface of the reflecting layer 30 where the reflecting dots 34 are formed (hereinafter, also referred to as "the front surface of the reflecting layer"). That is, the first λ/4 plate 16 is laminated on the convex side of the reflecting dots 34. In addition, the second λ/4 plate 20 is laminated on a surface of the reflecting layer 30 on the support 32 side (hereinafter, also referred to as "the back surface of the reflecting layer").

The first λ/4 plate 16 and the second λ/4 plate 20 are well-known λ/4 plates of the related art. In a case where light incident on the λ/4 plate is linearly polarized light, the λ/4 plate converts the linearly polarized light into circularly polarized light. In a case where light incident on the λ/4 plate is circularly polarized light, the λ/4 plate converts the circularly polarized light into linearly polarized light.

As described above, the transparent screen according to the present invention is suitably combined with the short focal length projector that emits linearly polarized light. The first λ/4 plate 16 disposed on the side (front surface side) to which light is projected from the short focal length projector converts incident linearly polarized light into circularly polarized light such that the circularly polarized light is emitted to the reflecting layer 30. In addition, the second λ/4 plate 20 disclosed on the back surface side of the reflecting layer 30 converts circularly polarized light having transmitted through the reflecting layer 30 into linearly polarized light such that the linearly polarized light is incident on the polarizing film 18 described below.

The first λ/4 plate 16 is disposed to align a slow axis such that the outgoing light is circularly polarized light in a direction in which the reflecting dots 34 of the reflecting layer 30 reflect light.

The second λ/4 plate 20 is disposed to align a slow axis such that the circularly polarized light having transmitted through the reflecting layer 30 is converted into linearly polarized light. In addition, the second λ/4 plate 20 is disposed such that a polarization direction of light emitted from the second λ/4 plate 20 is parallel to an absorption axis of the polarizing film 18 described below in case of being observed from a direction perpendicular to the transparent screen 12a.

In addition, the first λ/4 plate 16 and the second λ/4 plate 20 are disposed such that the slow axis of the first λ/4 plate 16 and the slow axis of the second λ/4 plate 20 are parallel or perpendicular to each other and preferably perpendicular to each other.

By disposing the first λ/4 plate 16 and the second λ/4 plate 20 such that the slow axes thereof are parallel or perpendicular to each other, circularly polarized light obtained by the first λ/4 plate 16 can be converted into linearly polarized light by the second λ/4 plate 20. Here, in a case where first λ/4 plate 16 and the second λ/4 plate 20 are disposed such that the slow axes thereof are parallel to each other, linearly polarized light that is rotated by 90° with respect to linearly polarized light before being incident on the first λ/4 plate 16 is obtained. In addition, due to the effect of wavelength dispersion, even in a case where light at 550 nm returns to linearly polarized light, light components at other wavelengths become elliptically polarized light. Therefore, there is a change in tint. On the other hand, in a case where first λ/4 plate 16 and the second λ/4 plate 20 are disposed such that the slow axes thereof are perpendicular to each other, linearly polarized light in the same direction as that of linearly polarized light before being incident on the first λ/4 plate 16 is obtained, and the wavelength dispersion can be canceled. Therefore, a change in tint can be suitably suppressed.

The first λ/4 plate 16 and the second λ/4 plate 20 have the same configuration except for the disposition configuration, and thus will be collectively described as the λ/4 plate in the following description.

The λ/4 plate (plate having a λ/4 function) is a plate having a function of converting linearly polarized light having a specific wavelength into circularly polarized light or converting circularly polarized light into linearly polarized light. More specifically, the λ/4 plate is plate in which an in-plane retardation value at a specific wavelength λ nm satisfies Re (λ)=λ/4 (or an odd number of times thereof). This expression only has to be satisfied at any wavelength (for example, 550 nm) in a visible range.

The λ/4 plate may have a configuration in which only an optically-anisotoropic layer having a λ/4 function is formed or a configuration in which an optically-anisotoropic layer having a λ/4 function is formed on a support. In a case where the λ/4 plate includes the support, a combination of the support and the optically-anisotoropic layer is the λ/4 plate.

As the λ/4 plate, a well-known λ/4 plate can be used. Accordingly, the in-plane retardation value Re (550) at a wavelength of 550 nm is not particularly limited and is preferably 115 nm to 165 nm, more preferably 120 nm to 150 nm, and still more preferably 125 nm to 145 nm. Even in a case where the λ/4 plate includes a layer other than the optically-anisotoropic layer, for example, the support, it is preferable that the in-plane retardation value of the λ/4 plate is in the above-described range.

In addition, in the λ/4 plate of the transparent screen according to the embodiment of the present invention, it is preferable that a thickness-direction retardation Rth (550) is as low as possible.

Specifically, Rth (550) is preferably −50 nm to 50 nm and more preferably −30 nm to 30 nm, and it is still more preferably that Rth (λ) is zero. As a result, the result that is preferable from the viewpoint of converting linearly polarized light which is obliquely incident on the λ/4 plate into circularly polarized light can be obtained.

<Polarizing Film>

The polarizing film 18 is laminated on a surface of the second λ/4 plate 20 opposite to the reflecting layer 30 side, and shields a part of light having transmitted through the reflecting layer 30 and the second λ/4 plate 20. Specifically, the polarizing film 18 allows transmission of light that is incident at a small incidence angle, that is, substantially perpendicular to the film surface of the polarizing film 18, and shields light that is incident at a large angle with respect to the film surface of the polarizing film 18. As a result, a hot spot caused by transmitted light having transmitted through the transparent screen 12a can be reduced.

The polarizing film 18 has an absorption axis in a thickness direction thereof. In other words, the polarizing film 18 has an absorption axis parallel to a normal direction perpendicular to the film surface.

In a case where light is incident in a direction perpendicular to the polarizing film 18, an advancing direction of the light does not intersect with the absorption axis of the polarizing film 18. Therefore, the light transmits through the polarizing film 18 without being absorbed.

On the other hand, in a case where light is incident on the polarizing film 18 from an oblique direction, the light advances in a direction intersecting with the absorption axis. Therefore, a polarized light component in a direction parallel to the absorption axis is absorbed, and a polarized light component in a direction perpendicular to the absorption axis transmits through the polarizing film 18. As a result, the polarizing film 18 shields a part of the light.

The absorption axis of the polarizing film 18 is aligned substantially perpendicular to the polarizing film surface. By aligning the absorption axis substantially perpendicular to a main surface of the absorption axis (maximum surface; hereinafter, referred to as "polarizing film surface"), the polarizing film 18 has high transmittance in case of being seen from the front, but absorbs longitudinal waves and has low transmittance in case of being seen from an oblique direction.

In addition, "substantially perpendicular direction" represents that the absorption axis is aligned at an angle of 80° to 90° with respect to the polarizing film surface, and the angle is preferably 85° to 90°, and more preferably 90° (perpendicular). In a case where the angle is less than 80° with respect to the polarizing film surface of the absorption axis, the transmittance decreases in a case where the polarizing film is seen from the front.

Here, the alignment of the absorption axis in a direction substantially perpendicular to the polarizing film surface can be verified, for example, by observing a cross-section of the polarizing film with a transmission electron microscope (TEM).

The configuration of the polarizing film 18 is not limited as long as the polarizing film 18 has an absorption axis in the thickness direction. In particular, it is preferable that the polarizing film 18 includes a birefringent material (a material having birefringence) and is obtained by aligning the birefringent material in a predetermined direction. More specifically, for example, in a case where a dichromatic colorant described below is used as the birefringent material, a major axis of the dichromatic colorant is disposed parallel to the thickness direction of the polarizing film 18.

The birefringent material can be appropriately selected according to the purpose without any particular limitation, and examples thereof include inorganic particles, a dichromatic colorant, anisotropic metal nanoparticles, carbon nanotubes, and a metal complex. Among these, a dichromatic colorant, anisotropic metal nanoparticles, or carbon nanotubes is more preferable.

—Dichromatic Colorant—

Examples of the dichromatic colorant include an azo colorant and an anthraquinone colorant. Among these dichromatic colorants, one kind may be used alone, or two or more kinds may be used in combination.

In the present invention, the dichromatic colorant is defined as a compound having a function of absorbing light. An absorption maximum and an absorption band of the dichromatic colorant are not particularly limited, but it is preferable that the dichromatic colorant has an absorption maximum in a yellow range (Y), a magenta range (M), or a cyan range (C). In addition, two or more dichromatic colorants may be used, it is preferable that a mixture of dichromatic colorants having an absorption maximum in Y, M, or C is used, and it is more preferable that a mixture obtained by mixing dichromatic colorants to absorb light in the entire visible range (400 nm to 750 nm) is used. Here, the yellow range refers to a range of 420 nm to 490 nm, the magenta range refers to a range of 495 nm to 570 nm, and the cyan range refers to a range of 620 nm to 750 nm.

Here, a chromophore of the dichromatic colorant will be described. The chromophore of the dichromatic colorant can be appropriately selected according to the purpose without any particular limitation, and examples thereof include an azo colorant, an anthraquinone colorant, a perylene colorant, a merocyanine colorant, an azomethine colorant, a phthaloperylene colorant, an indigo colorant, an azulene colorant, a dioxazine colorant, a polythiophene colorant, and a phenoxazine colorant. Among these, an azo colorant, an anthraquinone colorant, or a phenoxazine colorant is preferable, and an anthraquinone colorant or a phenoxazone colorant (phenoxazin-3-one) is more preferable.

Specific examples of the colorant include colorants described in paragraphs "0022" to "0075" of JP2008-275976A, the content of which is incorporated herein by reference.

—Anisotropic Metal Nanoparticles—

The anisotropic metal nanoparticles are rod-shaped metal nanoparticles having several nanometers to several hundreds of nanometers. The rod-shaped metal nanoparticles refer to particles having an aspect ratio (major axis length/minor axis length) of 1.5 or higher.

The anisotropic metal nanoparticles show surface plasmon resonance and have absorption in an ultraviolet to infrared range. For example, in the anisotropic metal nanoparticles having a minor axis length of 1 nm to 50 nm, a major axis length of 10 nm to 1000 nm, and an aspect ratio of 1.5 or higher, an absorption position can be changed in a minor axis direction and a major axis direction. Therefore, a polarizing film in which the anisotropic metal nanoparticles are aligned in an oblique direction with respect to a horizontal surface of the film is an anisotropic absorbing film.

—Carbon Nanotubes—

The carbon nanotubes are elongated tubular carbon having a fiber diameter of 1 nm to 1000 nm, a fiber length of 0.1 μm to 1000 μm, and an aspect ratio of 100 to 10000. Examples of a well-known method of preparing the carbon nanotubes include an arc discharge method, a laser vaporization method, a thermal CVD method, and a plasma CVD method. In carbon nanotubes obtained using the arc discharge method and the laser vaporization method, single wall nanotubes (SWNT) formed of only one graphene sheet and multi wall nanotubes (MWNT) formed of a plurality of graphene sheets are present.

In addition, in the thermal CVD method and the plasma CVD method, mainly MWNT can be prepared. SWNT has a tubular structure obtained by rolling one graphene sheet where carbon atoms are hexagonally bonded through a strongest bond called a SP2 bond.

The content of the birefringent material in the polarizing film is preferably 0.1 mass % to 90.0 mass % and more preferably 1.0 mass % to 30.0 mass %. In a case where the content of the birefringent material is 0.1 mass % or higher, sufficient polarizability can be obtained. On the other hand, in a case where the content of the birefringent material is 90 mass % or lower, the polarizing film can be formed without hindrance, and the transmittance of the polarizing film can be maintained.

Depending on a method of forming (aligning) the polarizing film, the polarizing film may include other components such as a dispersant, a solvent, or a binder resin in addition to the birefringent material.

<<Method of Forming Polarizing Film>>

The method of forming the polarizing film can be appropriately selected according to the purpose without any particular limitation as long as the absorption axis can be made to be substantially perpendicular to the substrate surface (polarizing film surface), and examples thereof include (1) a method of depositing metal nanorods on a liquid crystal alignment region, (2) a guest-host liquid crystal method, and (3) an anodized alumina method. Among these, the guest-host liquid crystal method is more preferable.

Specific examples of the method include colorants described in paragraphs "0087" to "0108" of JP2008-275976A, the content of which is incorporated herein by reference.

The thickness of the polarizing film can be appropriately selected according to the purpose without any particular limitation, and is preferably 0.1 μm to 10 μm and more preferably 0.3 μm to 3 μm.

The image display system 10 according to the embodiment of the present invention includes: the transparent screen 12a in which the first λ/4 plate 16, the reflecting layer 30, the second λ/4 plate 20, and the polarizing film 18 are laminated; and the short focal length projector 14.

The short focal length projector 14 is a well-known short focal length projector that displays an image on the transparent screen 12a by optionally performing keystone correction (distortion correction) and projecting projection light that carries the image to the transparent screen 12a.

Here, in the image display system 10 according to the embodiment of the present invention, a projector of which outgoing light is linearly polarized light is used as the short focal length projector 14.

In other words, in the present invention, the outgoing light of the short focal length projector 14 is linearly polarized light, and the transparent screen 12a includes: the first λ/4 plate 16 that converts linearly polarized light as outgoing light of the short focal length projector 14 into circularly polarized light; and the reflecting layer 30 that reflects right or left circularly polarized light.

In a case where the outgoing light is linearly polarized light, various well-known projectors such as a liquid crystal on silicon (LCOS) projector or a laser projector can be used as the short focal length projector 14.

In addition, the short focal length projector has a large incidence angle of light projected on the transparent screen (angle with respect to a normal line perpendicular to a projection surface of the transparent screen), and the distance (focal length) from the projector to the transparent screen is short.

In addition, in the image display system 10 according to the embodiment of the present invention, it is preferable that convex sides of the reflecting dots 34 of the reflecting layer 30 are disposed to face the projector 14 side, and it is preferable that the image display system 10 is a so-called front projection type in which an image is observed on the projector 14 side.

In the following description, the short focal length projector 14 will also be simply referred to as "projector 14".

In the present invention, the short focal length projector is disposed such that an incidence angle of outgoing light from the projector is 30° to 70° with respect to a normal line perpendicular to the transparent screen 12a.

In the image display system 10 according to the embodiment of the present invention, it is preferable that the projector 14 is disposed such that an incidence angle of outgoing light from the projector 14 is 40° to 60° with respect to the normal line perpendicular to the transparent screen 12a.

In addition, in the projector 14 of which outgoing light is linearly polarized light, it is preferable that the outgoing light is a P-wave with respect to the transparent screen 12a, and it is preferable that an incidence angle of light from the projector 14 is 56°±10° with respect to the normal line perpendicular to the transparent screen 12a.

Figure 3:
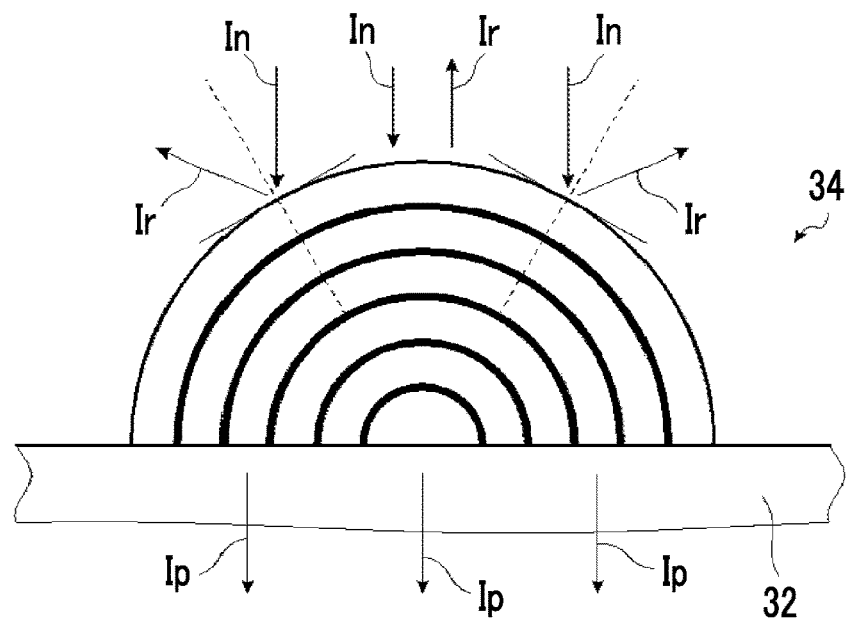
FIG. 3 is a conceptual diagram showing the action of the transparent screen according to the embodiment of the present invention.

As described above, the transparent screen 12a according to the embodiment of the present invention reflects light using the reflecting dots obtained by immobilizing a cholesteric liquid crystalline phase, and an angle between a helical axis of the cholesteric liquid crystalline phase and the surface of the reflecting dot is preferably in a range of 70° to 90° as shown in FIG. 2. As a result, as shown in FIG. 3, the transparent screen 12a can reflect light incident on the reflecting dots not only by retroreflection but also in various directions on the light incidence side.

Therefore, in the image display system 10 according to the embodiment of the present invention, an image can be suitably recognized at a wide viewing angle from the projector side not only in a case where light is projected from the normal direction perpendicular to the transparent screen but also in a case where light is projected at a large angle with respect to a normal line perpendicular to a projection screen in a projector disposed below (above) the transparent screen, for example, in the projector.

Accordingly, the image display system 10 according to the embodiment of the present invention is a front projection type, and the incidence angle of the projector 14 with respect to the normal line perpendicular to the transparent screen 12a is 30° to 70°. As a result, the projector 14 can be disposed near the transparent screen such that the image display system can be minimized. In addition, since the image display system 10 is a front projection type, an optical path from the projector 14 to an observer can be made to be a folded optical path using the transparent screen. Therefore, the overall optical path length can be reduced, and the image display system can be further minimized.

In addition, the projector 14 emits light at the selective reflection wavelength of the reflecting dots 34 of the transparent screen 12a. Accordingly, in the image display system 10 shown in FIG. 1, the transparent screen 12a includes one kind of reflecting dots 34, and thus displays a monochromic image.

Hereinafter, the transparent screen 12a and the image display system 10 according to the embodiment of the present invention will be described in more detail by describing the action of the image display system 10.

First, linearly polarized light carrying an image that is emitted from the projector 14 is converted into circularly polarized light by the first λ/4 plate 16.

The circularly polarized light obtained by the first λ/4 plate 16 is incident on the reflecting layer 30.

Only the circularly polarized light at the selective reflection wavelength that is incident on the reflecting layer 30 is reflected by the reflecting dots 34, and light components other than the light at the selective reflection wavelength and light incident on portions other than the reflecting dots 34 pass through the reflecting layer 30.

An image is displayed (projected) on the transparent screen 12a by the circularly polarized light at the selective reflection wavelength that is reflected from the reflecting dots 34.

Next, the circularly polarized light having passed through the reflecting layer 30 is incident on the second λ/4 plate 20.

The circularly polarized light incident on the second λ/4 plate 20 is converted into linearly polarized light, and the linearly polarized light is incident on the polarizing film 18.

Here, as described above, the polarizing film 18 has an absorption axis in the thickness direction. Accordingly, the polarizing film 18 allows transmission of light that is incident at a small incidence angle (light that is incident substantially perpendicular to) with respect to the film surface of the polarizing film 18, and shields light that is incident at a large angle with respect to the film surface of the polarizing film 18. As a result, a hot spot caused by transmitted light having transmitted through the transparent screen 12a can be reduced.

As described above, an image is displayed on the transparent screen by light reflected from the reflecting layer. In addition, light which is not used for displaying the image passes through the transparent screen.

That is, in the case of the transparent screen that displays an image using the reflecting layer, light having passed through the reflecting layer passes through the transparent screen and is observed from the surface (back surface) of the transparent screen opposite to the projector.

Therefore, on the back surface side, a light source of the projector is observed and a hot spot occurs in a case where outgoing light of the projector is observed from a straight advancing direction of the outgoing light through the transparent screen. The hot spot is significantly glaring. In particular, in the case of a laser projector in which a laser is used as a light source, the hot spot is extremely glaring.

On the other hand, the transparent screen 12a according to the embodiment of the present invention includes the polarizing film 18 having an absorption axis substantially perpendicular to the film surface on the back surface side of the reflecting layer 30.

Therefore, in the linearly polarized light that has passed through the reflecting layer 30 and is obtained by the second λ/4 plate 20, light incident substantially perpendicular to the film surface of the polarizing film 18 transmits through the polarizing film 18 without being absorbed because an advancing direction thereof is parallel to the absorption axis of the polarizing film 18. On the other hand, an advancing direction of light incident in an oblique direction with respect to the film surface of the polarizing film 18 intersects with the absorption axis of the polarizing film 18. In addition, as described above, this incidence light is linearly polarized light that is polarized in a direction parallel to the absorption axis of the polarizing film 18, and thus is absorbed by the polarizing film 18. As a result, the transmittance increases in a case where the polarizing film 18 is seen from the front, and the transmittance decreases in a case where the polarizing film 18 is seen from an oblique direction.

Accordingly, by using the transparent screen 12a in combination of the short focal length projector 14 having a large incidence angle of light with respect to the transparent screen 12a, a hot spot caused on the back surface side of the transparent screen 12a in the straight advancing direction of the outgoing light from the short focal length projector 14, that is, in the oblique direction of the transparent screen 12a can be significantly suppressed.

In addition, as described above, the reflecting layer of the transparent screen according to the embodiment of the present invention has a structure obtained by immobilizing a cholesteric liquid crystalline phase, and reflects light in the selective reflection wavelength range. That is, the reflecting layer does not reflect light in the entire wavelength range of visible light, and has a wavelength range where the reflecting layer does not reflect light. Therefore, high transparency can also be secured. Further, light passes through the structure of the reflecting layer obtained by immobilizing a cholesteric liquid crystalline phase without being scattered, and thus the haze is also low.

Further, in the present invention, light is preferably reflected from the reflecting dots obtained by immobilizing a cholesteric liquid crystalline phase and more preferably light is reflected from reflecting dots in which an angle between a helical axis of the cholesteric liquid crystalline phase and the surface of the reflecting dot is in a range of 70° to 90° as shown in FIG. 2 such that an image is displayed on the transparent screen 12a.

Therefore, as shown in FIG. 3, the reflecting dots of the transparent screen 12a can reflect incidence light not only by retroreflection but also in various directions on the light incidence side. Accordingly, a wide viewing angle can be realized even in a case where projection light is incident on the transparent screen 12a at a large angle with respect to the normal line perpendicular to the transparent screen 12a in the short focal length projector 14 disposed near the transparent screen 12a.

As a result, according to the embodiment of the present invention, a high-quality image can be observed with a small front projection type image display system at a wide viewing angle with reflected light having a sufficient light amount.

Here, it is preferable that light incident from the projector 14 to the transparent screen 12a is a P-wave with respect to the transparent screen 12a, and it is preferable that an incidence angle of light from the projector 14 to the transparent screen 12a is 56°±10° with respect to the normal line perpendicular to the transparent screen 12a.

In the image display system including the transparent screen, a light source of the projector is observed through the transparent screen such that a hot spot occurs, and a light source of the projector is also indirectly observed at a position where the outgoing light of the projector is specularly reflected from the screen surface such that a hot spot occurs.

Here, as is well-known in the art, a reflectivity of linearly polarized light varies depending on an incidence angle of a reflecting surface. In the case of a P-wave with respect to the reflecting surface, in a case where light is incident at an angle of 56° with respect to a normal line perpendicular to the reflecting surface, a reflectivity of the light is substantially zero.

Accordingly, in a case where light incident from the projector 14 of which outgoing light is linearly polarized light to the transparent screen 12a is a P-wave with respect to the transparent screen 12a, and in a case where the incidence angle of light from the projector 14, that is, the optical axis of the projector 14 is 56°±10° with respect to the normal line perpendicular to the transparent screen 12a, a hot spot caused by specular reflection of light of the projector 14 from the transparent screen 12a can be significantly reduced.

As a method of converting linearly polarized light emitted from the projector 14 into a P-wave with respect to the transparent screen 12a, various well-known methods such as a method of rotating the light source of the projector 14 around the optical axis can be used.

Herein the transparent screen 12a shown in FIG. 1, the second λ/4 plate 20 is provided between the reflecting layer 30 and the polarizing film 18. However, the present invention is not limited to this configuration.

Figure 4:
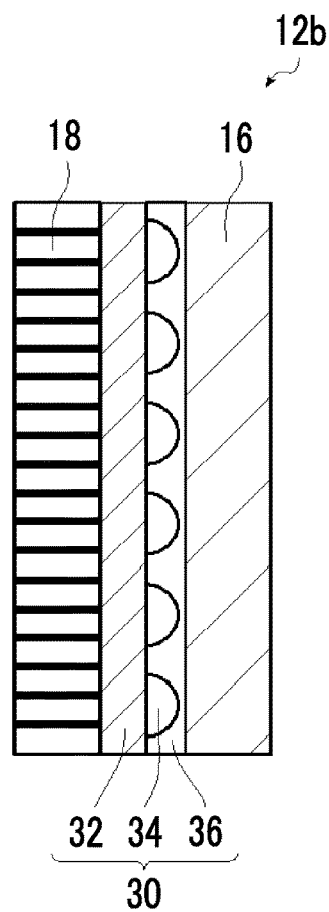
FIG. 4 is a diagram conceptually showing another example of the transparent screen according to the embodiment of the present invention.

FIG. 4 is a conceptual diagram showing another example of the transparent screen according to the embodiment of the present invention.

A transparent screen 12b shown in FIG. 4 has a configuration in which the first λ/4 plate 16, the reflecting layer 30, and the polarizing film 18 are laminated in this order. That is, the polarizing film 18 is laminated on a surface of the reflecting layer 30 on the support 32 side.

The transparent screen 12b shown in FIG. 4 has the same configuration as the transparent screen 12a shown in FIG. 1, except that the second λ/4 plate 20 is not provided, and thus the same components are represented by the same reference numerals.

In a case where light is projected from the short focal length projector 14 to the transparent screen 12b from an oblique direction, linearly polarized light carrying an image that is emitted from the projector 14 is converted into circularly polarized light by the first λ/4 plate 16.

The circularly polarized light obtained by the first λ/4 plate 16 is incident on the reflecting layer 30.

Only the circularly polarized light at the selective reflection wavelength that is incident on the reflecting layer 30 is reflected by the reflecting dots 34, and light components other than the light at the selective reflection wavelength and light incident on portions other than the reflecting dots 34 pass through the reflecting layer 30.

An image is displayed (projected) on the transparent screen 12a by the circularly polarized light at the selective reflection wavelength that is reflected from the reflecting dots 34.

Next, the circularly polarized light having passed through the reflecting layer 30 is incident on the polarizing film 18.

The polarizing film 18 allows transmission of light that is incident at a small incidence angle (from a direction substantially perpendicular) with respect to the film surface of the polarizing film 18, and shields light that is incident at a large angle (from an oblique direction) with respect to the film surface of the polarizing film 18. At this time, since the incidence light is circularly polarized light, a part thereof absorbed by the polarizing film 18, and the remaining part transmits through the polarizing film 18. That is, in the light incident on the polarizing film 18 from an oblique direction, a polarized light component in a direction parallel to the absorption axis of the polarizing film 18 is absorbed.

Accordingly, the light amount of a hot spot caused on the back surface side of the transparent screen 12b in a straight advancing direction of the light that is incident from the short focal length projector 14 to the transparent screen 12b from an oblique direction can be significantly suppressed.

In addition, in the transparent screen shown in FIG. 1, the reflecting layer 30 is configured to include one layer in which the reflecting dots are two-dimensionally arranged. However, the present invention is not limited to this configuration, and a plurality of layers in which the reflecting dots are two-dimensionally arranged may be provided.

FIG. 5 is a conceptual diagram showing still another example of the transparent screen according to the embodiment of the present invention.

A transparent screen 12c shown in FIG. 5 has a configuration in which the first λ/4 plate 16, a reflecting layer 30b including a blue right circularly polarized light dot laminate 31bR, a green right circularly polarized light dot laminate 31gR, and a red right circularly polarized light dot laminate 31rR, the second λ/4 plate 20, and the polarizing film 18 are laminated in this order.

The transparent screen 12c shown in FIG. 5 has the same configuration as the transparent screen 12a shown in FIG. 1, except that the reflecting layer 30b is provided instead of the reflecting layer 30, and thus the same components are represented by the same reference numerals.

The reflecting layer 30b is a layer in which the blue right circularly polarized light dot laminate 31bR, the green right circularly polarized light dot laminate 31gR, and the red right circularly polarized light dot laminate 31rR are laminated.

The red right circularly polarized light dot laminate 31rR includes: the support 32; red right circularly polarized light reflecting dots 34rR that are two-dimensionally arranged on one surface of the support 32; and an overcoat layer 36 that embeds the red right circularly polarized light reflecting dots 34rR and is laminated on the support 32.

The green right circularly polarized light dot laminate 31gR includes: the support 32; green right circularly polarized light reflecting dots 34gR that are two-dimensionally arranged on one surface of the support 32; and the overcoat layer 36 that embeds the green right circularly polarized light reflecting dots 34gR and is laminated on the support 32.

The blue right circularly polarized light dot laminate 31bR includes: the support 32; blue right circularly polarized light reflecting dots 34bR that are two-dimensionally arranged on one surface of the support 32; and the overcoat layer 36 that embeds the blue right circularly polarized light reflecting dots 34bR and is laminated on the support 32.

The red right circularly polarized light reflecting dots 34rR reflect red right circularly polarized light at a red wavelength as the selective reflection wavelength, and allow transmission of the other light components.

The green right circularly polarized light reflecting dots 34gR reflect green right circularly polarized light at a green wavelength as the selective reflection wavelength, and allow transmission of the other light components.

The blue right circularly polarized light reflecting dots 34bR reflect blue right circularly polarized light at a blue wavelength as the selective reflection wavelength, and allow transmission of the other light components.

That is, these reflecting dots have different selective reflection wavelengths.

This way, by forming the reflecting dots that reflect red light, the reflecting dots that reflect green light, and the reflecting dots that reflect blue light, the red light, the green light, and the blue light incident on the transparent screen can be reflected, and an image projected on the transparent screen can be displayed in color. In addition, the present invention is applicable even in a case where the light emitted from the projector is red light, green light, or blue light.

Hereinafter, the action of the transparent screen 12c will be described.

First, in a case where linearly polarized light carrying an image that is emitted from the projector 14 to the transparent screen 12c is projected, the linearly polarized light is converted into right circularly polarized light by the first λ/4 plate 16.

The right circularly polarized light obtained by the first λ/4 plate 16 is incident on the reflecting layer 30b.

First, the right circularly polarized light incident on the reflecting layer 30b is incident on the blue right circularly polarized light dot laminate 31bR. Next, as described above, only blue right circularly polarized light incident on the blue right circularly polarized light reflecting dots 34bR is reflected from the blue right circularly polarized light reflecting dots 34bR, and light other than the blue right circularly polarized light incident on the blue right circularly polarized light reflecting dots 34bR and light incident on portions other than the blue right circularly polarized light reflecting dots 34bR pass through the blue right circularly polarized light dot laminate 31bR.

Next, the light having passed through the blue right circularly polarized light dot laminate 31bR is incident on the green right circularly polarized light dot laminate 31gR.

In the light incident on the green right circularly polarized light dot laminate 31gR, similarly, only green right circularly polarized light incident on the green right circularly polarized light reflecting dots 34gR is reflected from the green right circularly polarized light reflecting dots 34gR, and light other than the green right circularly polarized light incident on the green right circularly polarized light reflecting dots 34gR and light incident on portions other than the green right circularly polarized light reflecting dots 34gR pass through the green right circularly polarized light dot laminate 31gR.

Next, the light having passed through the green right circularly polarized light dot laminate 31gR is incident on the red right circularly polarized light dot laminate 31rR.

In the light incident on the red right circularly polarized light dot laminate 31rR, similarly, only red right circularly polarized light incident on the red right circularly polarized light reflecting dots 34rR is reflected from the red right circularly polarized light reflecting dots 34rR, and light other than the red right circularly polarized light incident on the red right circularly polarized light reflecting dots 34rR and light incident on portions other than the red right circularly polarized light reflecting dots 34rR pass through the red right circularly polarized light dot laminate 31rR and pass through the reflecting layer 30b.

An image is displayed (projected) on the transparent screen 12c by the blue, green, red right circularly polarized light components reflected from the blue right circularly polarized light reflecting dots 34bR, the green right circularly polarized light reflecting dots 34gR, and the red right circularly polarized light reflecting dots 34rR.

Next, the right circularly polarized light having passed through the reflecting layer 30b is incident on the second λ/4 plate 20.

The circularly polarized light incident on the second λ/4 plate 20 is converted into linearly polarized light, and the linearly polarized light is incident on the polarizing film 18.

The polarizing film 18 allows transmission of light that is incident at a small incidence angle (light that is incident substantially perpendicular to) with respect to the film surface of the polarizing film 18, and shields light that is incident at a large angle with respect to the film surface of the polarizing film 18. As a result, a hot spot caused by transmitted light having transmitted through the transparent screen 12c can be reduced.

As described above, in this example, right circularly polarized light which has passed through the reflecting layer 30b and is not used for display is absorbed by the polarizing film 18. Therefore, a hot spot can be significantly reduced.

Further, as in the case of the above-described example, an image can be displayed at a wide viewing angle by light reflection having high diffusibility using the reflecting dots.

In addition, the reflecting layer 30b does not reflect in the entire wavelength range of visible light, and has a wavelength range so as not to reflect light in a wavelength range between red light and green light, a wavelength range between green light and blue light, or a long or short wavelength range of visible light. Therefore, in the transparent screen 12c, high transparency can also be secured.

As in the example shown in FIG. 5, in a case where the reflecting layer has a configuration in which a plurality of dot laminates (the red right circularly polarized light dot laminate 31rR, the green right circularly polarized light dot laminate 31gR, and the blue right circularly polarized light dot laminate 31bR) are laminated, the dot laminates may be bonded using the overcoat layer 36, or may be bonded using the bonding layer as in the case of the above-described bonding layer that bonds the respective films to each other.

In addition, in the example shown in FIG. 1, each of the reflecting dots 34 is configured to reflect light in one wavelength range. However, the present invention is not limited to this configuration, and one reflecting dot may be configured to reflect light components in a plurality of wavelength ranges. That is, one dot may be configured to include two or more regions where light components in different wavelength ranges are reflected.

Figure 6:
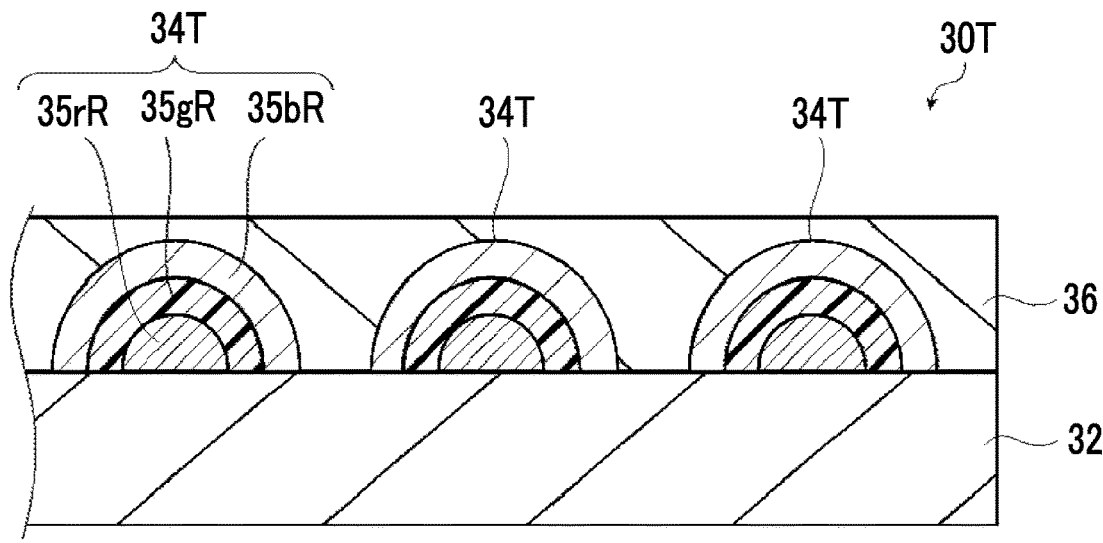
FIG. 6 is a diagram conceptually showing another example of a reflecting layer.

FIG. 6 is a schematic diagram showing another example of the reflecting layer.

A reflecting layer 30T shown in FIG. 6 has a configuration in which a plurality of three-color reflecting dots 34T are two-dimensionally arranged on the support 32, each of the three-color reflecting dots 34T including a red right circularly polarized light reflecting region 35rR that reflects red right circularly polarized light, a green right circularly polarized light reflecting region 35gR that reflects green right circularly polarized light, and a blue right circularly polarized light reflecting region 34bR that reflects blue right circularly polarized light.

Specifically, the three-color reflecting dot 34T has a configuration in which the three layers are laminated in the normal direction perpendicular to the support 32, the three layers including the red right circularly polarized light reflecting region 35rR that is formed on the surface on the support 32 side in a hemispherical shape, the green right circularly polarized light reflecting region 35gR that is laminated on the surface of the red right circularly polarized light reflecting region 35rR, and the blue right circularly polarized light reflecting region 34bR that is laminated on the surface of the green right circularly polarized light reflecting region 35gR.

The three-color reflecting dot 34T includes the layer that reflects red light, the layer that reflects green light, and the layer that reflects blue light. Therefore, the red light, the green light, and the blue light incident on one dot can be reflected.

In the example shown in FIG. 6, the three-layers that reflect red light, green light, and blue light, respectively, are provided. However, the present invention is not limited to this configuration, two layers that reflect light components in different wavelength ranges may be provided, or four or more layers that reflect light components in different wavelength ranges may be provided.

In addition, in the example shown in FIG. 6, the three-color reflecting dot 34T has a configuration in which the red right circularly polarized light reflecting region 35rR, the green right circularly polarized light reflecting region 35gR, and the blue right circularly polarized light reflecting region 34bR are laminated in this order from the support 32 side. However, the present invention is not limited to this configuration, and the lamination order of the respective layers is not particularly limited.

In addition, in the example shown in FIG. 1, all the reflecting dots 34 in one dot laminate reflect light at the same wavelength range. However, the present invention is not limited to this configuration, two or more kinds of dots that reflect light in different wavelength ranges may be provided.

Figure 7:
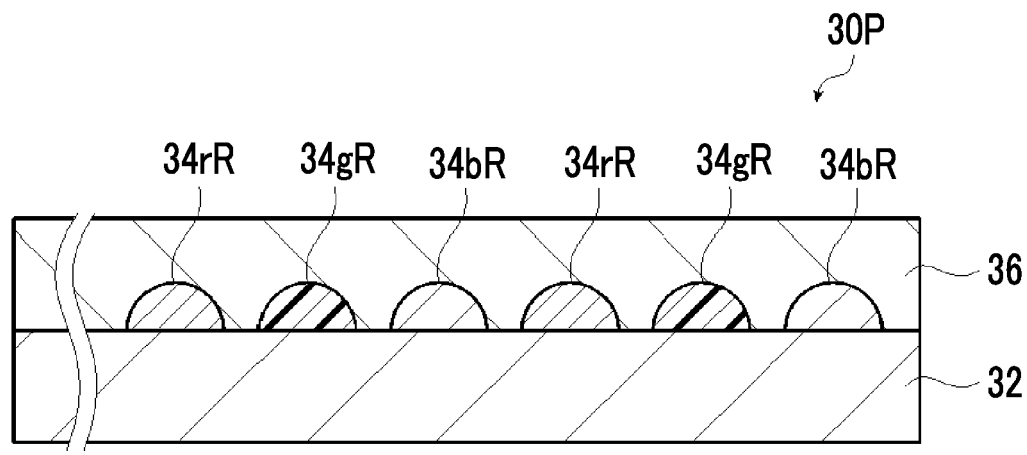
FIG. 7 is a diagram conceptually showing still another example of the reflecting layer.

For example, as illustrated in FIG. 7, a reflecting layer 30P may have a configuration in which a plurality of reflecting dots are two-dimensionally arranged in the same layer, the reflecting dots including the red right circularly polarized light reflecting dots 34rR that reflect red right circularly polarized light, the green right circularly polarized light reflecting dots 34gR that reflect green right circularly polarized light, and the blue right circularly polarized light reflecting dot 34bR that reflect blue right circularly polarized light.

In the example shown in FIG. 7, the reflecting dots that reflect red light, green light, and blue light, respectively, are provided. However, the present invention is not limited to this configuration, two kinds of reflecting dots that reflect light components in different wavelength ranges may be provided, or four or more kinds of reflecting dots that reflect light components in different wavelength ranges may be provided.

In addition, in a case where two or more kinds of reflecting dots that reflect light components in different wavelength ranges are provided, the arrangement of the dots is not particularly limited. For example, the dots may be arranged alternately or randomly.

As described above, in the present invention, the projector 14 of which outgoing light is linearly polarized light is used. Here, in the image display system in which a laser projector is used as the projector 14, there may be a problem in that a phenomenon called speckle occurs, the speckle being a phenomenon in which laser beams are mutually intensified or weakened due to high coherence such that a large number of fine bright and dark spots are formed on a display image and flicker of a twinkling image occurs.

On the other hand, in the transparent screen according to the embodiment of the present invention, light carrying a display image is diffused by the reflecting dots with high diffusibility. Therefore, in a case where the laser projector is used, the occurrence of speckle can be suppressed.

In addition, in a case where a projector having a narrow wavelength range of outgoing light such as a laser projector is used as the projector 14, it is preferable that a liquid crystal compound having low Δn (low Δn liquid crystal (LC)) is used as liquid crystal constituting the cholesteric liquid crystalline phase for forming the reflecting dots of reflecting layer such that the reflecting dots (reflecting layer) reflect only circularly polarized light in a narrow wavelength range corresponding to the wavelength range of the outgoing light of the laser projector.

With this configuration, the wavelength range of light that can pass through the reflecting layer can be widened, the transparency of the transparent screen can be further improved, and light in a wavelength range incident from the projector 14 to the reflecting dots can be reliably reflected. As a result, an appropriate image can be displayed.

Specifically, in a case where a laser projector is used as the projector, Δn of the liquid crystal compound constituting the reflecting dots is preferably 0.02 to 0.1 and more preferably 0.04 to 0.06.

In addition, in the image display system shown in the example of the drawing, linearly polarized light is made to be incident on the first λ/4 plate 16 using the projector 14 of which outgoing light is polarized light. However, the present invention is not limited to this configuration.

For example, in the image display system according to the embodiment of the present invention including the transparent screen including the reflecting layer that reflect only right circularly polarized light (or only left circularly polarized light), a projector of which outgoing light is unpolarized light may be used as the projector, light emitted from the projector may be made to be incident on a linear polarizing plate to be converted into linearly polarized light, and the linearly polarized light obtained by the linear polarizing plate may be made to be incident on the first λ/4 plate 16.

In addition, in the example shown in FIG. 1, the reflecting layer has a configuration in which the reflecting dots obtained by immobilizing a cholesteric liquid crystalline phase are two-dimensionally arranged. However, the present invention is not limited to this configuration, a uniform layer obtained by immobilizing a cholesteric liquid crystalline phase may be configured to reflect circularly polarized light in one direction at the selective reflection wavelength and to allow transmission of the other light components. That is, the reflecting layer may include a layer (film) that is uniform over the entire surface and is a so-called solid layer (solid film).

As a liquid crystal compound for forming the solid film, the same material as the liquid crystal compound used for forming the reflecting dots and preferably the same material as the polymerizable liquid crystal compound can be used.

Accordingly, the solid film may be prepared as in the case of the reflecting dots by preparing a liquid crystal composition including the liquid crystal compound to form the solid film such that a cholesteric liquid crystalline phase having a helical pitch corresponding to the corresponding wavelength range and having a helical twisting direction corresponding to circularly polarized light to be reflected is immobilized.

In addition, the reflecting layer may include one solid film or two or more solid films obtained by immobilizing a cholesteric liquid crystalline phase. In a case where the reflecting layer includes two or more solid films, selective reflection wavelengths of the solid films may be the same as or different from each other.

In addition, the reflecting layer may include one or layers (dot laminates) in which reflecting dots obtained by immobilizing a cholesteric liquid crystalline phase are two-dimensionally arranged and one or more solid films obtained by immobilizing a cholesteric liquid crystalline phase.

In a case where the reflecting dots and the solid film are provided, the reflecting dots may be two-dimensionally arranged and formed on the surface of the solid film obtained by immobilizing a cholesteric liquid crystalline phase instead of forming the reflecting dots on the support.

Hereinabove, the transparent screen and the image display system according to the embodiment of the present invention have been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Underlayer>

Components shown below were stirred and dissolved in a container held at 25° C. to prepare an underlayer-forming solution.

(Underlayer-Forming Solution)

Mixture A of the following rod-shaped liquid crystal compounds: 100 parts by mass IRGACURE 819 (manufactured by BASF SE): 3 parts by mass The following compound A: 0.6 parts by mass Methyl ethyl ketone: 932.4 parts by mass Mixture A of the following rod-shaped liquid crystal compounds

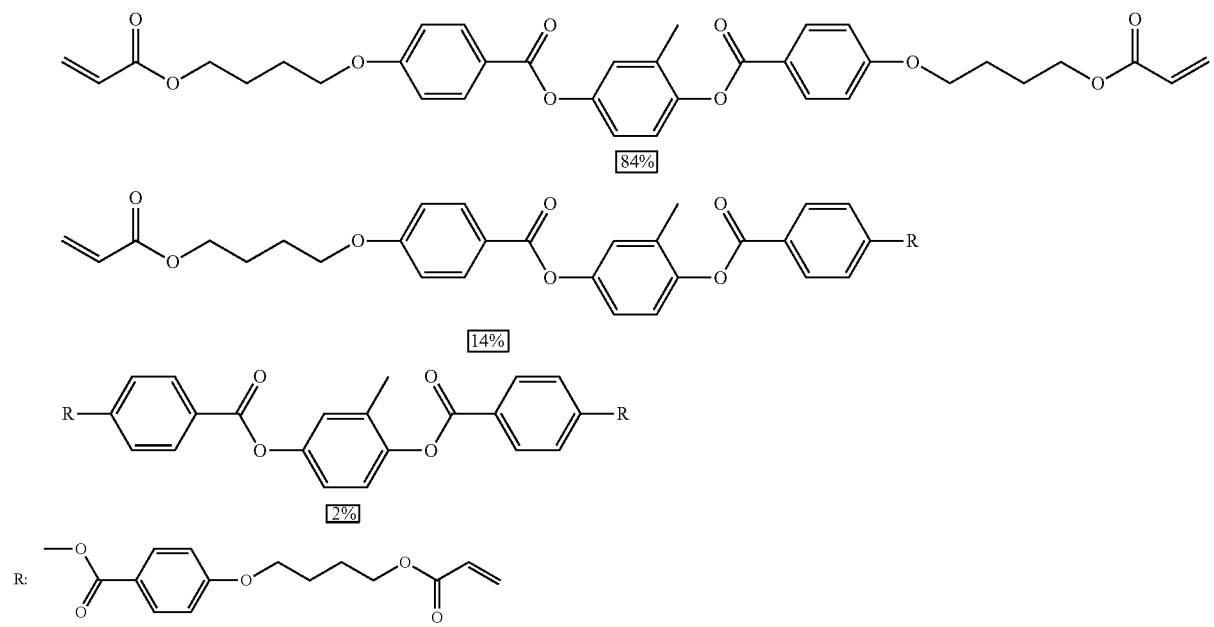

Numerical values are represented by mass %. In addition, R represents a group to be bonded to oxygen.

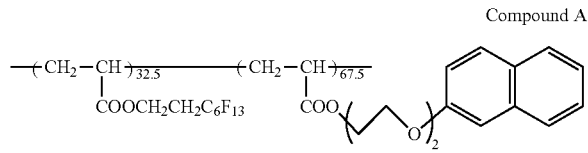

Compound A

As the support 32, a transparent PET film (COSMOSHINE A4100, manufactured by Toyobo Co., Ltd.) having a thickness of 75 μm was prepared.

The prepared underlayer-forming solution was applied to the support 32 using a bar coater #2.6. Next, the coating film was heated such that the coating film surface temperature was 50° C., and then was dried for 60 seconds. Next, in a nitrogen purged atmosphere having an oxygen concentration of 100 ppm or lower, the coating film was irradiated with ultraviolet light at 500 mJ/cm² using an ultraviolet irradiation device to promote a crosslinking reaction. As a result, an underlayer was prepared.

The haze value of the support 32 on which the underlayer was formed was measured and was 0.8%.

<Formation of Cholesteric Liquid Crystal Dot>

Components shown below were stirred and dissolved in a container held at 25° C. to prepare a cholesteric liquid crystal ink solution gR (liquid crystal composition).

(Cholesteric Liquid Crystal Ink Solution gR)
Cyclopentanone: 139.6 parts by mass
Mixture A of the rod-shaped liquid crystal compounds: 100 parts by mass
IRGACURE 907 (manufactured by BASF SE): 3.0 parts by mass
KAYACURE DETX (manufactured by Nippon Kayaku Co., Ltd.): 1 part by mass
The following chiral agent A: 5.78 parts by mass
The following surfactant: 0.08 parts by mass

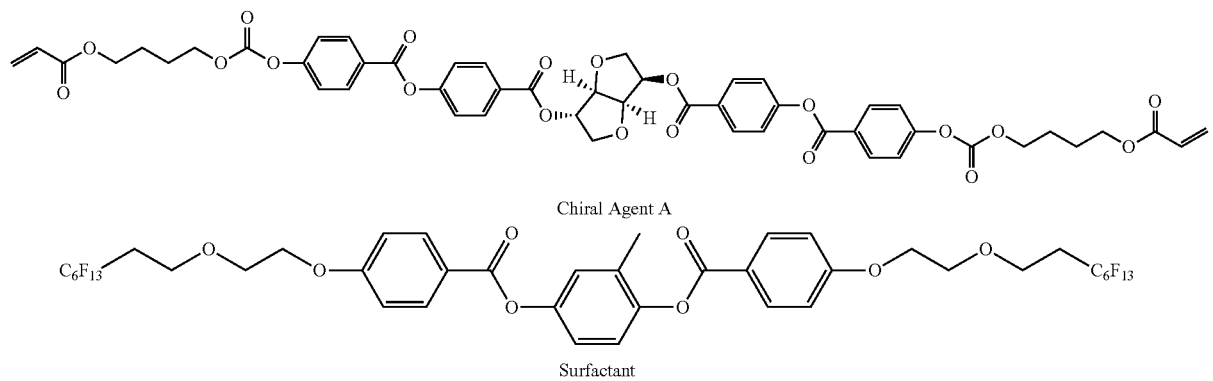

Chiral Agent A

Surfactant

The cholesteric liquid crystal ink solution gR is a material for forming dots that reflect light having a selective reflection wavelength of 550 nm. In addition, the cholesteric liquid crystal ink solution gR is a material for forming dots that reflect right circularly polarized light. That is, the cholesteric liquid crystal ink solution gR is a material for forming the green right circularly polarized light reflecting dots 34gR.

Using an ink jet printer (DMP-2831, manufactured by Fujifilm Dimatix Inc.) in which a platen was heated to 60° C., the prepared cholesteric liquid crystal ink solution gR was jetted to the entire 100×100 mm region of the underlayer of the support 32 on which the underlayer was formed such that the distance (pitch) between dot centers was 60 μm. The cholesteric liquid crystal ink solution gR was dried on the platen at 60° C. for 30 seconds or longer and then was irradiated with ultraviolet light at 500 mJ/cm² at room temperature using an ultraviolet irradiation device to be cured. As a result, the support 32 having a surface on which the green right circularly polarized light reflecting dots 34gR were formed was obtained.

<Dot Shape and Evaluation of Cholesteric Structure>

Among the prepared green right circularly polarized light reflecting dots 34gR, any 10 dots were selected, and the shapes of the dots were observed using a laser microscope (manufactured by Keyence Corporation). As a result, the average diameter of the dots was 30 μm, the average maximum height was 6 μm, an average angle (contact angle) at a contact portion between a dot surface of a dot end portion and an underlayer surface was 44°, and the height was continuously increased in a direction from the dot end portion to the center.

Regarding one green right circularly polarized light reflecting dot 34gR positioned at the center of the support 32, a surface including the dot center was cut in a direction perpendicular to the support 32, and the obtained cross-section was observed using a scanning electron microscope. As a result, a stripe pattern including bright portions and dark portions was observed in the dot as shown in FIGS. 2 and 3.

Figure 8:
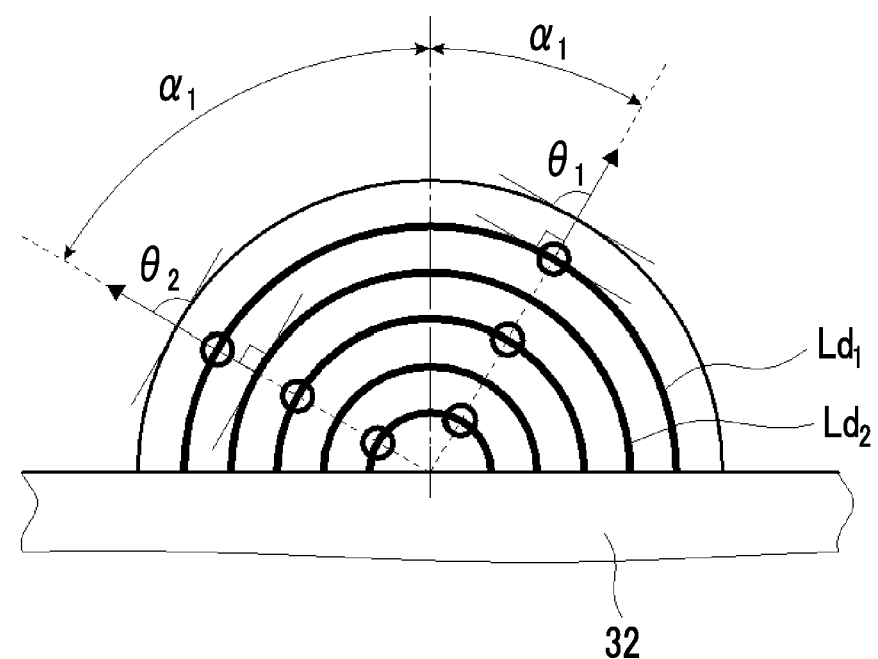
FIG. 8 is a conceptual diagram showing an evaluation method of a cholesteric structure in Examples of the present invention.

Further, in the cross-sectional view, as shown in FIG. 2, at a position where the angle $\alpha_1$ was 30° and at a position where the angle $\alpha_1$ was 60°, the angles $\theta_1$ and $\theta_2$ between normal directions of lines, which were formed using dark portions of the dot, and the surface of the dot were measured, the angle $\alpha_1$ being an angle with respect to a line (chain line) perpendicular to the surface of the support 32 passing through the center of the dot. As conceptually shown in FIG. 8, the measurement was on the lines which were formed using three dark portions including: a line which was formed using the outermost dark portion of the dot (the line $Ld_1$ (dot end portion) which was formed using the first dark portion in FIG. 2); a line (dot center) which was formed using the innermost dark portion of the dot; and a line (between the dot end portion and the center) which was formed using a dark portion between the dot end portion and the dot center.

As a result, the angles measured at the dot end portion, at the portion between the dot end portion and the dot center, at the dot center were 90°, 89°, and 90°, respectively. That is, in the dot, the angles between the normal directions of the lines, which were formed using the dark portions of the dot, and the surface of the dot were substantially the same even at the vicinity of the surface of the dot, at the center (innermost portion) of the dot, and at the intermediate portion of the dot.

<Dot Area Ratio>

Any five portions were selected from the support 32 on which the green right circularly polarized light reflecting dots 34gR were formed and were observed using a laser microscope (manufactured by Keyence Corporation) to measure area ratios of dots in a 1 mm×1 mm region. As a result, the average value of the area ratios of the dots in the five portions was 20.2%.

<Formation of Overcoat Layer 36>

Components shown below were stirred and dissolved in a container held at 25° C. to prepare an overcoat layer-forming coating solution.

(Overcoat Layer-Forming Coating Solution)
Methyl ethyl ketone: 103.6 parts by mass
KAYARAD DPCA-30 (manufactured by Nippon Kayaku Co., Ltd.): 40 parts by mass
The following compound L: 60 parts by mass
The compound A: 0.6 parts by mass
IRGACURE 127 (manufactured by BASF SE): 3 parts by mass Compound L

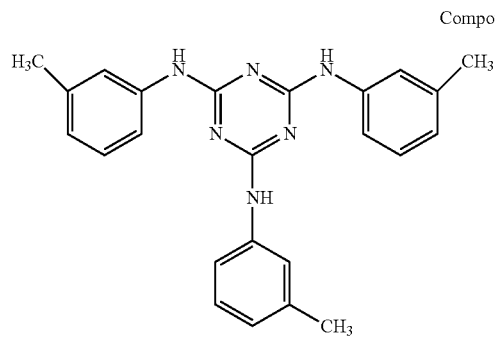

The prepared overcoat layer-forming coating solution was applied to the support 32 (underlayer) on which the green right circularly polarized light reflecting dots 34gR were formed using a bar coater #8.

Next, the coating film was heated such that the coating film surface temperature was 50° C., and then was dried for 60 seconds. Next, the coating film was irradiated with ultraviolet light at 500 mJ/cm$^2$ using an ultraviolet irradiation device to promote a crosslinking reaction. As a result, the overcoat layer 36 was prepared, and the green right circularly polarized light dot laminate 31gR was obtained.

<Preparation of Cholesteric Liquid Crystal Ink Solution rR and Cholesteric Liquid Crystal Ink Solution bR>

A cholesteric liquid crystal ink solution rR was prepared under the same conditions as those of the cholesteric liquid crystal ink solution gR, except that the addition amount of the chiral agent A was changed to 4.7 parts by mass. In addition, a cholesteric liquid crystal ink solution bR was prepared under the same conditions as those of the cholesteric liquid crystal ink solution gR, except that the addition amount of the chiral agent A was changed to 7.02 parts by mass.

The cholesteric liquid crystal ink solution rR is a material for forming the red right circularly polarized light reflecting dots 34rR that reflect right circularly polarized light having a selective reflection wavelength of 650 nm. In addition, the cholesteric liquid crystal ink solution bR is a material for forming the blue right circularly polarized light reflecting dots 34bR that reflect right circularly polarized light having a selective reflection wavelength of 450 nm.

<Preparation of Dot Laminates>

The red right circularly polarized light dot laminate 31rR and the blue right circularly polarized light dot laminate 31bR were prepared under the same conditions as those of the green right circularly polarized light dot laminate 31gR, except that the prepared cholesteric liquid crystal ink solution rR and the prepared cholesteric liquid crystal ink solution bR were used instead of the cholesteric liquid crystal ink solution gR.

<Preparation of Protective Film 01>

A cellulose acetate film was prepared with reference to Examples (paragraphs "0267" to "0270") described in JP2012-018396A. This cellulose acetate film was set as a protective film 01.

<Preparation of Aligned Film>

28 mL/m$^2$ of an aligned film-forming coating solution #16 having the following composition was applied to a surface of the protective film 01 using a wire bar coater #16. Next, the coating film was dried with warm air at 60° C. for 60 seconds and dried with warm air at 90° C. for 150 seconds. The surface of the formed film was rubbed with a rubbing roll while rotating the film in a direction parallel to a transport direction at 1000 rpm. As a result, the protective film 01 with the aligned film was prepared.

(Aligned Film-Forming Coating Solution)
The following modified polyvinyl alcohol: 10 parts by mass
Water: 370 parts by mass
Methanol: 120 parts by mass
Glutaraldehyde (crosslinking agent): 0.5 parts by mass

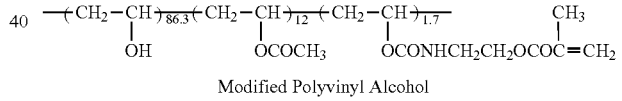

Modified Polyvinyl Alcohol

<Preparation of λ/4 Plate>

A λ/4 plate was prepared by forming an optically-anisotoropic layer on the protective film 01 with the aligned film with reference to Examples (paragraphs "0272" to "0282") described in JP2012-018396A. Re (550) and Rth (550) were 138 nm and 5 nm, respectively.

The two λ/4 plates prepared as described above were used as the first λ/4 plate 16 and the second λ/4 plate 20.

<Preparation of Polarizing Film>

1.11 g of an initiator solution [a solution in which 0.90 g of IRGACURE 907 (manufactured by Ciba Specialty Chemicals) and 0.30 g of KAYACURE DETX (manufactured by Nippon Kayaku Co., Ltd.) were dissolved in 8.80 g of methyl ethyl ketone (MEK)] was added to a liquid crystal solution in which 3.04 g of a liquid crystal compound having a photopolymerizable group (manufactured by BASF SE, trade name: PALIOCOLOR LC242) and 0.1 g of a polymer surfactant (MEGAFACE F780F, manufactured by DIC Corporation) were dissolved in 5.07 g of methyl ethyl ketone (MEK), and the reaction solution was stirred for 5 minutes to completely dissolve the components.

Next, 0.023 g of a dichromatic azo colorant G 241 (manufactured by Hayashibara Co., Ltd.) and 0.005 g of a dichromatic azo colorant G472 (manufactured by Hayashibara Co., Ltd.) were added to the obtained reaction and were ultrasonically dispersed for 5 minutes. As a result, a polarizing film-forming coating solution was prepared.

Next, a protective film 01 of the second λ/4 plate on which an optically-anisotoropic layer was not formed was spin-coated with a 10 mass % polyvinyl alcohol (PVA, trade name: MP203, manufactured by Kuraray Co., Ltd.) aqueous solution under conditions of rotation speed: 500 rpm and 15 seconds, and the coating film was dried. As a result, a PVA homeotropic alignment film was formed.

Next, the PVA homeotropic alignment film was spin-coated with the polarizing film-forming coating solution under conditions of rotation speed: 1000 rpm and 20 seconds, and the coating film was heated for 2 minutes in a constant-temperature tank set to 90° C. and then was irradiated with ultraviolet light (UV) (mercury xenon lamp, 200 W, 73 mJ/cm$^2$). As a result, the polarizing film in which not only the curable liquid crystal molecule but also the dichromatic colorant were homeotropically aligned was prepared on the λ/4 plate of the PVA homeotropic alignment film surface.

<Preparation of Transparent Screen>

By bonding the prepared dot laminates, the first λ/4 plate, and the second λ/4 plate on which the polarizing film was formed using a pressure sensitive adhesive (SK DINE, manufactured by Soken Chemical&Engineering Co., Ltd.), the transparent screen shown in FIG. 5 was prepared.

The lamination order was the first λ/4 plate 16, the red right circularly polarized light dot laminate 31rR, the green right circularly polarized light dot laminate 31gR, the blue right circularly polarized light dot laminate 31bR, the second λ/4 plate 20, and the polarizing film 18. In addition, the dot laminates were laminated such that the dots were present on the surface on the first λ/4 plate 16 side.

Comparative Example 1

A transparent screen was prepared under the same conditions as in Example 1, except that the polarizing film 18 was not provided.

That is, the transparent screen includes the first λ/4 plate, the reflecting layer, and the second λ/4 plate.

[Evaluation]
<Projector and Disposition>

Using LSPX-P1 (manufactured by Sony Corporation) as a projector, an image was projected from below the prepared transparent screen such that a white image having a size of 5 cm×5 cm was displayed at the center of the transparent screen.

This projector was a laser projector, and outgoing light thereof was linearly polarized light.

<Evaluation of Hot Spot (Straight Advancing Transmitted Light)>

Figure 9:
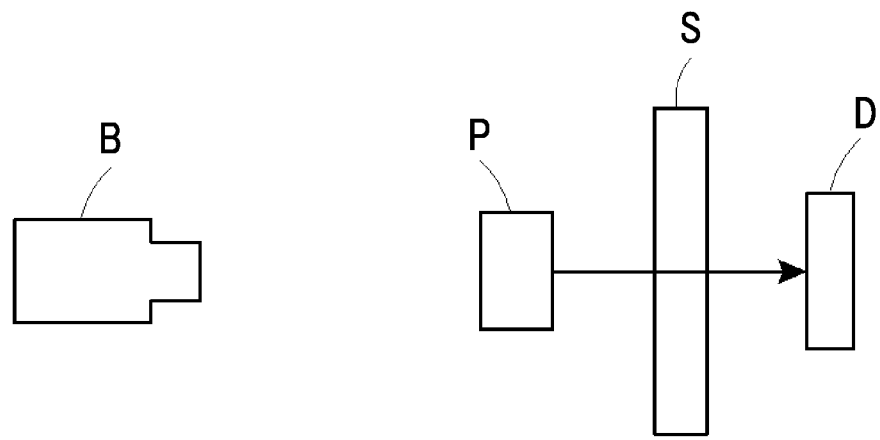
FIG. 9 is a conceptual diagram showing the evaluation method in Examples of the present invention.
Figure 10:
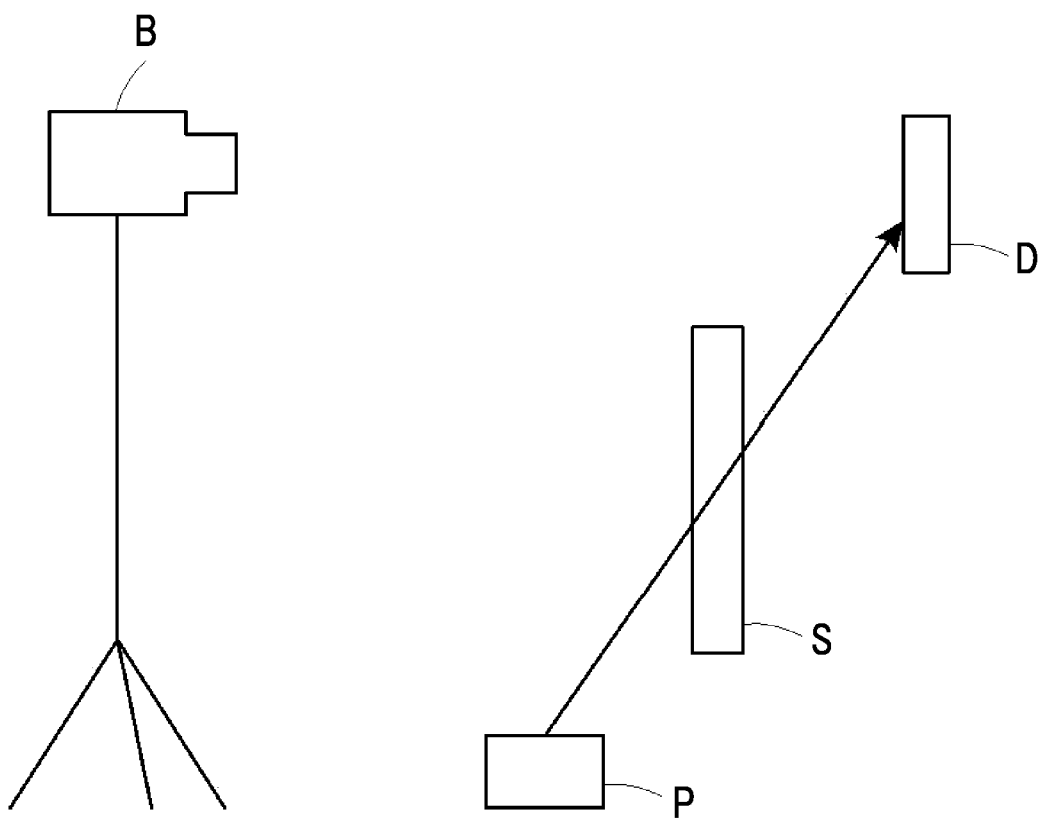
FIG. 10 is a conceptual diagram showing the evaluation method in Examples of the present invention.

As shown in FIGS. 9 and 10, a perfect diffusion plate D formed of barium sulfate was disposed on an extended line of the outgoing light of a projector P and the center of a transparent screen S, and the luminance was measured from a normal direction perpendicular to the perfect diffusion plate D using a luminance colorimeter B (BM-5, manufactured by Topcon Technohouse Corporation).

FIG. 9 is a top view, and FIG. 10 is a side view.

In a case where the luminance measurement result of the transparent screen according to Comparative Example 1 was normalized as 100, it was found that the luminance measurement result of the transparent screen according to Example 1 was 10 and a hot spot was significantly suppressed.

As can be seen from the above results, the effects of the present invention are obvious.

EXPLANATION OF REFERENCES

10: image display system
12a to 12c: transparent screen
14: short focal length projector
16: first λ/4 plate
18: polarizing film
20: second λ/4 plate
30: reflecting layer
30T: three-color right circularly polarized light reflecting layer
30P: three-color right circularly polarized light reflecting layer
31rR: red right circularly polarized light dot laminate
31gR: green right circularly polarized light dot laminate
31bR: blue right circularly polarized light dot laminate
32: support
34: reflecting dot
34rR: red right circularly polarized light reflecting dot
34gR: green right circularly polarized light reflecting dot
34bR: blue right circularly polarized light reflecting dot
34T: three-color reflecting dot
35rR: red right circularly polarized light reflecting region
35gR: green right circularly polarized light reflecting region
34bR: blue right circularly polarized light reflecting region
36: overcoat layer

What is claimed is:

1. A transparent screen comprising, in this order:
a first λ/4 plate;
a reflecting layer that has a structure obtained by immobilizing a cholesteric liquid crystalline phase and reflects a part of incidence light; and
a polarizing film that has an absorption axis in a thickness direction,
wherein the absorption axis of the polarizing film is aligned at an angle of 80° to 90° with respect to a surface of the polarizing film.

2. The transparent screen according to claim 1, further comprising:
a second λ/4 plate that is provided between the reflecting layer and the polarizing film.

3. The transparent screen according to claim 2,
wherein a slow axis of the first λ/4 plate and a slow axis of the second λ/4 plate are perpendicular to each other.

4. The transparent screen according to claim 3,
wherein the reflecting layer has a structure in which reflecting dots obtained by immobilizing a cholesteric liquid crystalline phase are two-dimensionally arranged, and
the reflecting dots are convex on the first λ/4 plate side.

5. The transparent screen according to claim 4,
wherein the polarizing film has a structure in which a dichromatic colorant is homeotropically aligned.

6. An image display system comprising:
the transparent screen according to claim 5; and
a short focal length projector that projects light from the first λ/4 plate side to the transparent screen,
wherein light emitted from the short focal length projector is linearly polarized light.

7. The transparent screen according to claim 1,
wherein the reflecting layer has a structure in which reflecting dots obtained by immobilizing a cholesteric liquid crystalline phase are two-dimensionally arranged, and
the reflecting dots are convex on the first $\lambda/4$ plate side.

8. The transparent screen according to claim 1,
wherein the polarizing film has a structure in which a dichromatic colorant is homeotropically aligned.

9. An image display system comprising:
the transparent screen according to claim 1; and
a short focal length projector that projects light from the first $\lambda/4$ plate side to the transparent screen,
wherein light emitted from the short focal length projector is linearly polarized light.

10. The transparent screen according to claim 1,
wherein the absorption axis of the polarizing film is aligned perpendicular to a surface of the polarizing film.

\* \* \* \* \*